(12) United States Patent
Hirasawa et al.

(10) Patent No.: US 7,718,940 B2
(45) Date of Patent: May 18, 2010

(54) COMPOUND-EYE IMAGING APPARATUS

(75) Inventors: Taku Hirasawa, Kyoto (JP); Ichiro Oyama, Osaka (JP); Tomokuni Iijima, Osaka (JP); Michiyoshi Nagashima, Nara (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 11/995,286

(22) PCT Filed: Jun. 27, 2006

(86) PCT No.: PCT/JP2006/312773
§ 371 (c)(1),
(2), (4) Date: Jan. 10, 2008

(87) PCT Pub. No.: WO2007/013250
PCT Pub. Date: Feb. 1, 2007

(65) Prior Publication Data
US 2009/0127430 A1 May 21, 2009

(30) Foreign Application Priority Data
Jul. 26, 2005 (JP) .............................. 2005-216294

(51) Int. Cl.
*G01B 9/00* (2006.01)
(52) U.S. Cl. .................. 250/201.8; 250/226; 348/340; 359/350
(58) Field of Classification Search .............. 250/201.8, 250/226, 208.1, 216; 348/340; 359/350, 359/356, 361
See application file for complete search history.

(56) References Cited

U.S. PATENT DOCUMENTS

| 5,757,423 | A | 5/1998 | Tanaka et al. |
|---|---|---|---|
| 6,205,259 | B1 | 3/2001 | Komiya et al. |
| 6,859,229 | B1 | 2/2005 | Suda |
| 6,882,368 | B1 | 4/2005 | Suda |
| 7,329,856 | B2 * | 2/2008 | Ma et al. ..................... 250/226 |
| 7,405,761 | B2 * | 7/2008 | Feldman et al. ............. 348/340 |
| 7,453,510 | B2 * | 11/2008 | Kolehmainen et al. ...... 348/340 |
| 7,460,167 | B2 * | 12/2008 | Schoonmaker et al. ...... 348/360 |
| 2002/0089596 | A1 | 7/2002 | Suda |
| 2002/0122124 | A1 | 9/2002 | Suda |

FOREIGN PATENT DOCUMENTS

| JP | 6-141246 | 5/1994 |
|---|---|---|
| JP | 7-222045 | 8/1995 |
| JP | 10-304235 | 11/1998 |

(Continued)

*Primary Examiner*—Seung C Sohn
(74) *Attorney, Agent, or Firm*—Hamre, Schumann, Mueller & Larson, P.C.

(57) ABSTRACT

A plurality of imaging optical lenses (301a to 301c) form a plurality of subject images on a plurality of imaging regions (302a to 302c), respectively. When viewed along a direction parallel with optical axes, at least one straight line connecting corresponding points in at least one pair of the subject images that are formed by at least one pair of the imaging optical lenses is inclined with respect to a direction in which pixels are arranged in the imaging regions. In this way, a high-resolution image always can be obtained regardless of the subject distance.

16 Claims, 13 Drawing Sheets

FOREIGN PATENT DOCUMENTS

| | | |
|---|---|---|
| JP | 2001-78212 | 3/2001 |
| JP | 2001-78213 | 3/2001 |
| JP | 2002-204462 | 7/2002 |
| JP | 2002-209226 | 7/2002 |
| JP | 2003-354493 | 12/2002 |
| JP | 2003-256875 | 9/2003 |

\* cited by examiner

| G | R | G | R |
|---|---|---|---|
| B | G | B | G |
| G | R | G | R |
| B | G | B | G |

| G | R | G | R |
|---|---|---|---|
| B | G | B | G |
| G | R | G | R |
| B | G | B | G |

| G | R | G | R |
|---|---|---|---|
| B | G | B | G |
| G | R | G | R |
| B | G | B | G |

| G | G | G | G |
|---|---|---|---|
| G | G | G | G |
| G | G | G | G |
| G | G | G | G |

| G | R | G | R |
|---|---|---|---|
| R | G | R | G |
| G | R | G | R |
| R | G | R | G |

| G | B | G | B |
|---|---|---|---|
| B | G | B | G |
| G | B | G | B |
| B | G | B | G |

COMPOUND-EYE IMAGING APPARATUS

TECHNICAL FIELD

The present invention relates to a compound-eye imaging apparatus that captures an image with a plurality of imaging optical lenses arranged substantially in the same plane.

BACKGROUND ART

Imaging apparatuses used in mobile equipment need to have both a high resolution and a small size. In many cases, the reduction in size is obstructed by the size and focal length of an imaging optical lens and the size of an imaging device.

In general, since the refractive index of a material varies depending on the wavelength of light, it is difficult to form an image of light from a subject including information of an entire wavelength range on an imaging plane using a single lens. Therefore, in an optical system of usual imaging apparatuses, a plurality of lenses are arranged along an optical axis direction so that images of red wavelength light, green wavelength light and blue wavelength light are formed on the same imaging plane. Accordingly, the optical system is elongated, resulting in a thicker imaging apparatus.

Therefore, as a technique effective for a reduction in size of imaging apparatuses, particularly for a reduction in thickness, a compound-eye imaging apparatus has been proposed in which a plurality of single lenses having a short focal length are arranged substantially in the same plane (see JP 2002-204462 A, for example). A compound-eye color imaging apparatus includes an optical system having a lens for blue wavelength light, a lens for green wavelength light and a lens for red wavelength light that are arranged on the same plane, and imaging devices respectively corresponding to the lenses. Since the wavelength range of light handled by each lens is limited, it becomes possible to form a subject image on the imaging device using the single lenses. Therefore, the thickness of the imaging apparatus can be reduced considerably.

FIG. 15 is a perspective view showing an exemplary compound-eye imaging apparatus. Numeral 900 denotes a lens array including three lenses 901a, 901b and 901c that are formed integrally. The lens 901a is for red wavelength light and forms a subject image in an imaging region 902a. A red wavelength separation filter (color filter) is attached to pixels (photodetector portions) in the imaging region 902a, and the imaging region 902a converts the formed red subject image into image information. Similarly, the lens 901b is for green wavelength light and forms a subject image in an imaging region 902b. A green wavelength separation filter (color filter) is attached to pixels (photodetector portions) in the imaging region 902b, and the imaging region 902b converts the formed green subject image into image information. Further, the lens 901c is for blue wavelength light and forms a subject image in an imaging region 902c. A blue wavelength separation filter (color filter) is attached to pixels (photodetector portions) in the imaging region 902c, and the imaging region 902c converts the formed blue subject image into image information. The pieces of image information outputted from the imaging regions 902a, 902b and 902c are superposed and synthesized, thereby obtaining color image information.

Although the compound-eye imaging apparatus described above can achieve a reduced thickness, it has a problem of a poorer resolution compared with a usual single-eye imaging apparatus. In the single-eye imaging apparatus, an imaging device having a large number of pixels (photodetector portions) arranged in an image forming plane converts incident light into image information. In order to take out color information at each position, the pixels respectively are provided with wavelength separation filters (color filters) in a Bayer arrangement. In other words, the wavelength separation filters transmitting green light are arranged in a checkered pattern so as to correspond to the arrangement of the large number of pixels arranged in a matrix, and the wavelength separation filters transmitting red light and those transmitting blue light are arranged alternately in the rest of the pixels. Each of the pixels only outputs the color information corresponding to the wavelength range of the light that is transmitted by the wavelength separation filter provided in that pixel and does not output color information corresponding to the wavelength range of the light that is not transmitted thereby. However, since the pieces of color information of three colors are known to be correlated in a local region of an image (see Hiroaki KOTERA and two others, "Representation of Full Color Image from a Single Color Image Using Color Correlation" Proceedings of 1988 Annual Conference of The Institute of Image Electronics Engineers of Japan 20, pp. 83-86 (1988), for example), the green color information can be estimated from the red or blue color information. Utilizing such characteristics, the missing color information is interpolated in the imaging device with the wavelength separation filters in the Bayer arrangement. Accordingly, it is possible to obtain a color image having a resolution corresponding to pixels as many as the total number of pixels. For example, in an imaging device with 1,000,000 pixels, 500,000 pixels detect green color information, 250,000 pixels detect blue color information, and 250,000 pixels detect red color information. However, by the above-described interpolation, it is possible to obtain color information having a resolution corresponding to 1,000,000 pixels for each of red, green and blue.

On the other hand, in the compound-eye imaging apparatus, since each of the imaging regions corresponding to the respective colors acquires any of red, green and blue color information, a color image corresponding to pixels as many as the pixels in that imaging region is achieved. For example, in the case where red color information, green color information and blue color information are acquired by three imaging regions each with 250,000 pixels, 750,000 pixels in total are needed, but the resolution of a color image obtained by superposition corresponds to 250,000 pixels.

As a method for improving the image resolution, there is a known technology called "pixel shifting" in which plural pieces of image information whose positional relationships between a subject image and pixels are shifted from each other are acquired by shifting the relative positional relationship between an optical system and an imaging device timewise or by separating a light beam into plural beams using a prism and making them to enter plural imaging devices and then synthesized so as to achieve a high-resolution image (see JP 10(1998)-304235 A, for example). In this case, the optimal amount of shifting is determined by the direction of shifting and the number of pieces of image information to be acquired. For example, in the case of synthesizing two pieces of image information, when the relative positional relationship between the subject image and the pixels is shifted by an odd multiple of one-half the arrangement pitch of the pixels (in the following, referred to as the "pixel pitch") between the two pieces of image information, it is possible to obtain the highest resolution image. This technology is applicable as long as it is possible to acquire plural pieces of image information whose relative positional relationships between the subject image formed by the lens and the pixels of the imaging device are shifted from each other, regardless of the method of shifting. In the present invention, the relative positional relationship between the subject image and the pixels of the imaging device that makes it possible to acquire the plural pieces of image information whose relative positional relationships between the subject image and the pixels of the imaging device are shifted from each other and to synthesize these plural pieces of image information so as to obtain a high-resolution image is referred to as a "shifted pixel arrangement."

In the compound-eye imaging apparatus, a high-resolution image also can be obtained as long as the relative positional relationships between the subject image and the pixels are shifted between plural pieces of image information, in other words, the shifted pixel arrangement can be achieved.

For example, JP 2002-209226 A mentions that, in a compound-eye imaging apparatus using a plurality of lenses to form a plurality of subject images on a plurality of imaging regions, a high-resolution image is obtained by arranging the plurality of lenses and a plurality of imaging devices so that the individual subject images are formed so as to be shifted in a direction connecting optical axes of the lenses, thus achieving the shifted pixel arrangement.

Also, in the compound-eye imaging apparatus, it is possible to determine the distance to a subject using a parallax generated due to the difference between the optical axes of the plurality of lenses.

DISCLOSURE OF INVENTION

Problem to be Solved by the Invention

However, in order to obtain a high-resolution image by the pixel shifting technology, the relative positional relationship between the subject image and the pixels always has to be the shifted pixel arrangement. FIG. 16A is a side view showing the positional relationship between a plurality of lenses, a subject and subject images in a compound-eye imaging apparatus, and FIG. 16B is a plan view thereof. FIG. 16A shows the state as viewed along a direction perpendicular to a plane including the optical axes of the plurality of lenses, and FIG. 16B shows the state viewed along a direction parallel with the optical axes of the lenses. Numerals $200a$ and $200b$ denote the optical axes of lenses $201a$ and $201b$, and numeral $202a$ and $202b$ denote positions at which the optical axes cross an imaging region $203$. An image of a subject $204$ located on the optical axis $200a$ is formed as subject images $205a$ and $205b$ by the lenses $201a$ and $201b$. In the compound-eye imaging apparatus, since the optical axes $200a$ and $200b$ of the lenses $201a$ and $201b$ are different, when the distances from the lenses $201a$ and $201b$ to the subject $204$ vary, the position of the subject image $205b$ moves in the imaging region $203$ along a straight line $206$ connecting intersection points $202a$ and $202b$. This phenomenon is called "parallax." When A indicates a subject distance (the distance from the lens $201a$ to the subject $204$), d indicates the distance between the optical axes $200a$ and $200b$ and f indicates an imaging distance, an amount S that the subject image $205b$ is shifted from the intersection point $202b$ is expressed by the following formula.

$$S = \frac{f \times d}{A}$$ [Formula 1]

In this way, the relative positional relationship between the subject image $205b$ and the pixels in the direction of the straight line $206$ varies according to the subject distance A.

Thus, when the shifting amount S of the subject image in the direction of the straight line $206$ is set to a predetermined relationship with respect to the pixel pitch, the resolution varies depending on the subject distance A, causing a problem that it is not always possible to obtain a high-resolution image.

It is an object of the present invention to provide a compound-eye imaging apparatus that can always obtain a high-resolution image regardless of the subject distance.

Means for Solving Problem

A compound-eye imaging apparatus according to the present invention includes a plurality of imaging optical lenses arranged in substantially the same plane, and a plurality of imaging regions for converting into a plurality of pieces of image information a plurality of subject images that are formed respectively by the plurality of imaging optical lenses. Each of the plurality of imaging regions includes a large number of pixels that are arranged in a plane perpendicular to respective optical axes of the plurality of imaging optical lenses.

Then, when viewed along a direction parallel with the optical axes, at least one straight line connecting corresponding points in at least one pair of the subject images that are formed by at least one pair of the imaging optical lenses is inclined with respect to a direction in which the pixels are arranged.

Effects of the Invention

In accordance with the present invention, the shifted pixel arrangement can be achieved in a direction perpendicular to a direction in which the pixels are arranged. The subject distance has substantially no influence on the relationship of this shifted pixel arrangement. Therefore, it always is possible to obtain a high-resolution image regardless of the subject distance.

BRIEF DESCRIPTION OF DRAWINGS

FIG. 12A is a plan view showing an arrangement of a color filter provided on one imaging region in the imaging apparatus according to Example 4 of the present invention.

FIG. 12B is a plan view showing an arrangement of a color filter provided on the other imaging region in the imaging apparatus according to Example 4 of the present invention.

FIG. 13A is a plan view showing another arrangement of the color filters provided on one imaging region in the imaging apparatus according to Example 4 of the present invention.

FIG. 13B is a plan view showing another arrangement of the color filters provided on the other imaging region in the imaging apparatus according to Example 4 of the present invention.

FIG. 14A is a plan view showing yet another arrangement of the color filters provided on one imaging region in the imaging apparatus according to Example 4 of the present invention.

FIG. 14B is a plan view showing yet another arrangement of the color filters provided on the other imaging region in the imaging apparatus according to Example 4 of the present invention.

DESCRIPTION OF THE INVENTION

Figure 1:
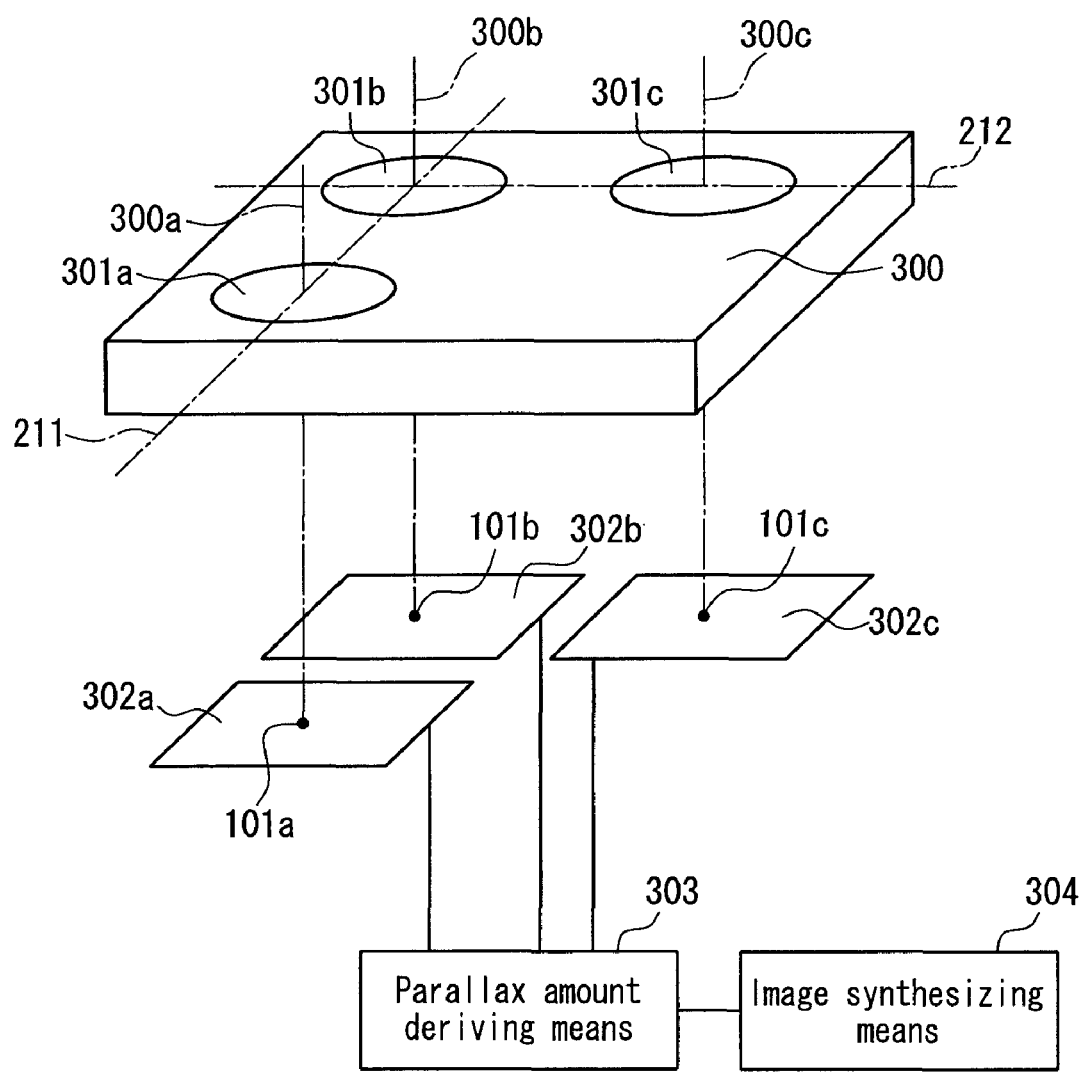
FIG. 1 is a perspective view showing a schematic configuration of a compound-eye imaging apparatus according to Embodiment 1 of the present invention.

In the present invention, the "direction in which the pixels are arranged" is determined as follows. A plurality of parallel first straight lines and a plurality of parallel second straight lines that are included in a plane in which a large number of pixels are arranged are assumed. The inclination of the plurality of first straight lines and that of the plurality of second straight lines are set so that the large number of pixels all are arranged at a plurality of intersection points at which these plurality of first straight lines and these plurality of second straight lines cross. Each of a first direction and a second direction that are respectively parallel with the plurality of first straight lines and the plurality of second straight lines set as above is referred to as the "direction in which the pixels are arranged."

Further, in the present invention, the "direction in which the pixels are arranged," on which attention is focused when considering the relationship with the straight line connecting a pair of optical axes of a pair of the imaging optical lenses, refers to a direction that forms a smaller angle (smaller than 90°) with the straight line connecting the pair of optical axes among the first direction and the second direction described above.

Moreover, in the present invention, the straight line being "inclined" with respect to the direction in which the pixels are arranged means that the straight line and the direction in which the pixels are arranged are not parallel with each other but cross at an angle other than 90°.

In the present invention, since a pair of the subject images that are formed by a pair of the imaging optical lenses are formed in the relationship of the shifted pixel arrangement in a direction perpendicular to the direction in which the pixels are arranged, the shifted pixel arrangement always can be achieved regardless of the distance to the subject. In other words, when viewed along the direction parallel with the optical axes of the lenses, by adjusting the angle θ that the straight line connecting the pair of optical axes of the pair of imaging optical lenses forms with the direction in which the pixels are arranged, the shifted pixel arrangement is achieved in a direction (in the following, referred to as a "pixel shifting direction") at right angles with the direction, in which the pixels are arranged, forming the angle θ with this straight line connecting the pair of optical axes.

In the case where the plurality of pieces of image information obtained from the plurality of imaging regions are synthesized, an image with the highest resolution is obtained when $$(2n-1) \times p/2 = d \times \sin\theta$$

is satisfied, where d indicates the distance between optical axes of a pair of imaging optical lenses, p indicates an arrangement pitch of the pixels along a direction perpendicular to the direction in which the pixels are arranged and n indicates a positive integer.

In practice, due to manufacturing variations, it is difficult to manufacture an imaging apparatus that satisfies this equation completely. When this equation is satisfied substantially, the effect of pixel shifting is achieved. In other words, when the inequality $$(2n-1) \times p/2 - p/4 < d \times \sin\theta < (2n-1) \times p/2 + p/4$$

is satisfied, it is possible to obtain a high-resolution image by pixel shifting.

Also, even with manufacturing variations, the shifted pixel arrangement can be achieved easily and reliably by adjusting the angle θ. Thus, the manufacturing is easy, leading to improved yield at the time of mass production.

In the present invention, by focusing attention on the fact that the parallax component in the pixel shifting direction is extremely small, the effect of pixel shifting is achieved regardless of the subject distance. However, it is difficult to bring the parallax component in the pixel shifting direction to zero. As described above, the parallax increases sharply as the subject distance decreases. Also, the parallax component in the pixel shifting direction increases in keeping with the angle θ (namely, n). Thus, it is preferable that n satisfies $$n < A\min/(4 \times f).$$

Here, Amin indicates a distance to the nearest subject whose image is to be captured (the minimum value of the subject distance A), and f indicates an imaging distance. When n satisfies the above-noted relationship, the angle θ is extremely small, so that a direction along which the subject image moves according to the variation in the subject distance (in other words, a direction of the straight line connecting the pair of optical axes) and the direction in which the pixels are arranged can be considered as substantially the same. Then, it becomes possible substantially to ignore the parallax component in the pixel shifting direction. Thus, the shifted pixel arrangement in the pixel shifting direction always can be achieved regardless of the subject distance.

Since the refractive index of a lens material and the efficiency of a diffraction grating depend on wavelengths, the lens characteristics improve by limiting the wavelengths. Accordingly, in the present invention, it is preferable that a filter transmitting light at a predetermined wavelength is provided on each optical path of the plurality of imaging optical lenses. This limits the wavelengths of the subject images to be formed on the imaging regions, thereby achieving clear images. The pre-synthesis images subjected to the pixel shifting are clear, so that a synthesized high-resolution image also becomes clear.

Further, filters transmitting light in the same wavelength range may be provided on individual optical paths of the plurality of imaging optical lenses. Thus, using a plurality of clear images in the same wavelength range, the subject distance can be determined by the parallax. As described above, the parallax caused by the difference in subject distance occurs in the direction of the straight line connecting the optical axes of the pair of lenses. In response to this, in the present invention, the shifted pixel arrangement is set in the direction perpendicular to the straight line connecting the optical axes of the pair of lenses. In this way, since the direction in which the parallax occurs and the direction of the shifted pixel arrangement are different in the present invention, variations in the subject distance (namely, the parallax) have substantially no influence on the shifted pixel arrangement. Thus, the accuracy of determining the subject distance does not vary substantially regardless of the subject distance, thus making it possible both to determine the subject distance and to raise the image resolution.

In order to achieve the shifted pixel arrangement in the present invention, the amount of pixel shifting, namely, the value of "d×sin θ" has to be set appropriately. For this purpose, it is appropriate to make fine adjustment to the angle θ while maintaining the distance d between the optical axes to be constant. Thus, it is preferable that the plurality of imaging optical lenses is an integrally-formed lens array. In this way, by making an adjustment so as to rotate slightly the entire lens array with respect to the plurality of imaging regions within a plane parallel with photodetector surfaces of the plurality of imaging regions instead of adjusting individual lenses, it is possible to achieve the shifted pixel arrangement in the present invention. Thus, the shifted pixel arrangement can be achieved easily without the need for assembling or forming a lens array at a high accuracy.

It is preferable that the imaging apparatus according to the present invention further includes a mechanism of rotating the plurality of imaging optical lenses and the plurality of imaging regions relative to each other in the plane perpendicular to the optical axes of the plurality of imaging optical lenses.

By providing such a rotating mechanism, it becomes possible to adjust the pixel shifting amount, namely, the angle θ easily and accurately in a manufacturing process. Incidentally, the adjustment of the angle θ is carried out in the manufacturing process, and the rotating mechanism already is fixed in a final product.

It is preferable that the imaging apparatus according to the present invention further includes a mechanism of adjusting a distance between the plurality of imaging optical lenses and the plurality of imaging regions.

This makes it possible to arrange the imaging regions reliably in imaging planes of the respective lenses, thereby achieving a plurality of pieces of clearer image information. Accordingly, by synthesizing these plurality of pieces of image information, a higher-resolution image can be obtained.

In the imaging apparatus according to the present invention, it is preferable that the number of the imaging optical lenses is at least three. In this case, it is preferable that, when viewed along the direction parallel with the optical axes, a first straight line and a second straight line respectively connecting the optical axes of two pairs of the imaging optical lenses form substantially a right angle and that $(2n-1) \times p1/2 - p1/4 < d1 \times \sin \theta1 < (2n-1) \times p1/2 + p1/4$ and $(2m-1) \times p2/2 - p2/4 < d2 \times \sin \theta2 < (2m-1) \times p2/2 + p2/4$ are satisfied, where, when viewed along the direction parallel with the optical axes, θ1 indicates an angle that the first straight line forms with a first arrangement direction of the pixels, θ2 indicates an angle that the second straight line forms with a second arrangement direction of the pixels, d1 indicates a distance between the optical axes of a pair of the imaging optical lenses arranged along the first straight line, d2 indicates a distance between the optical axes of a pair of the imaging optical lenses arranged along the second straight line, p1 indicates an arrangement pitch of the pixels along a direction perpendicular to the first arrangement direction, p2 indicates an arrangement pitch of the pixels along a direction perpendicular to the second arrangement direction, and m and n indicate positive integers.

Here, in the case where the pixels are arranged along two directions, a direction that forms a smaller angle (smaller than 90°) with the first straight line among the two arrangement directions is defined as the "first arrangement direction," and a direction that forms a smaller angle (smaller than 90°) with the second straight line is defined as the "second arrangement direction."

In this way, the shifted pixel arrangement can be achieved in a plurality of directions, thereby improving the resolution in these plurality of directions. Also, since at least three lenses are provided, pieces of image information of red, green and blue are obtained through the respective lenses and synthesized, thereby obtaining a color image. In the above description, the arrangement pitches p1 and p2 of the pixels may be the same, which achieves a similar effect.

In the above description, it is preferable that the distance d1 between the optical axes and the distance d2 between the optical axes are different.

In order to improve the resolution in a plurality of directions, the amounts of pixel shifting in the respective directions, namely, d1×sin θ1 and d2×sin θ2 need to be adjusted. However, when using a lens array in which a plurality of lenses are integrally-formed, it is not possible to adjust the positions of the individual lenses independently. Also, the positions of the lenses might include forming errors. If d1≠d2, the amount of pixel shifting in the respective directions when the lens array is rotated with respect to the imaging regions is adjusted in a wider range. Consequently, even when the lens array involves forming errors, it is possible to optimize the amount of pixel shifting in a plurality of directions, thus improving the resolution in the plurality of directions.

Alternatively, the arrangement pitch p1 and the arrangement pitch p2 may be different. In this case, even when the lens array involves forming errors, it also is possible to optimize the amount of pixel shifting in a plurality of directions, thus improving the resolution in the plurality of directions.

In the imaging apparatus according to the present invention, it is preferable that the number of the imaging optical lenses is four and the number of the imaging regions is four. In this case, when viewed along the direction parallel with the optical axes, optical axes of the four imaging optical lenses preferably are arranged at vertices of a substantial rectangle. Also, it is preferable that a filter transmitting light in a blue wavelength range is provided on an optical path of light entering one of the four imaging regions, a filter transmitting light in a red wavelength range is provided on an optical path of light entering one of the remaining three imaging regions, and a filter transmitting light in a green wavelength range is provided on an optical path of light entering the remaining two imaging regions.

This makes it possible to calculate a parallax amount using the two pieces of green image information containing much brightness information. By calculating the parallax amount using light in the same wavelength range, the accuracy of the parallax amount improves. Using this parallax amount, parallax amounts of red image information and blue image information can be calculated, respectively. Thus, it is possible to obtain a color image whose resolution is raised in the two directions. Also, the subject distance may be calculated using this parallax amount. In that case, the accuracy of the subject distance improves.

It is preferable that the four imaging regions are formed on a common single imaging device, and the substantial rectangle and a shape of an effective pixel region of the imaging device are substantially similar. This makes it possible to utilize the pixels in the imaging device effectively without any waste.

The following is a detailed description of embodiments of the present invention, with reference to the accompanying drawings.

Embodiment 1

A compound-eye imaging apparatus according to the present embodiment improves vertical and horizontal spatial sampling characteristics compared with a conventional compound-eye imaging apparatus.

FIG. 1 is a perspective view showing an example of the compound-eye imaging apparatus according to Embodiment 1. Numeral 300 denotes a lens array formed of a transparent resin and including three lenses 301a, 301b and 301c that are integrally-formed. Optical axes 300a, 300b and 300c of the three lenses 301a, 301b and 301c are parallel with each other. The three lenses 301a, 301b and 301c are arranged in substantially the same plane so that, when viewed along a direction parallel with these optical axes, a first straight line 211 connecting the optical axes 300a and 300b and a second straight line 212 connecting the optical axes 300b and 300c form a right angle. The lenses 301a, 301b and 301c form subject images on imaging regions 302a, 302b and 302c, respectively. The imaging regions 302a, 302b and 302c respectively have a large number of pixels (photodetector portions) arranged in a plane orthogonal to the optical axes 300a, 300b and 300c, and each of the pixels converts incident light into electric signals. In this way, the imaging regions 302a, 302b and 302c convert the subject images respectively formed thereon into pieces of image information and output them. The imaging regions 302a, 302b and 302c are formed by dividing an effective pixel region of a common single imaging device. Thus, the pieces of image information from the imaging regions 302a, 302b and 302c are obtained by extracting pixel signals corresponding to the respective imaging regions from the signals outputted from this single imaging device.

In order to achieve a high-resolution image, the three lenses 301a, 301b and 301c and the imaging regions 302a, 302b and 302c are arranged so that a shifted pixel arrangement in a direction perpendicular to each of directions in which the pixels are arranged is achieved between the subject images formed respectively by the lenses 301a, 301b and 301c and the pixels in the imaging regions 302a, 302b and 302c. This will be described in the following.

Figure 2:
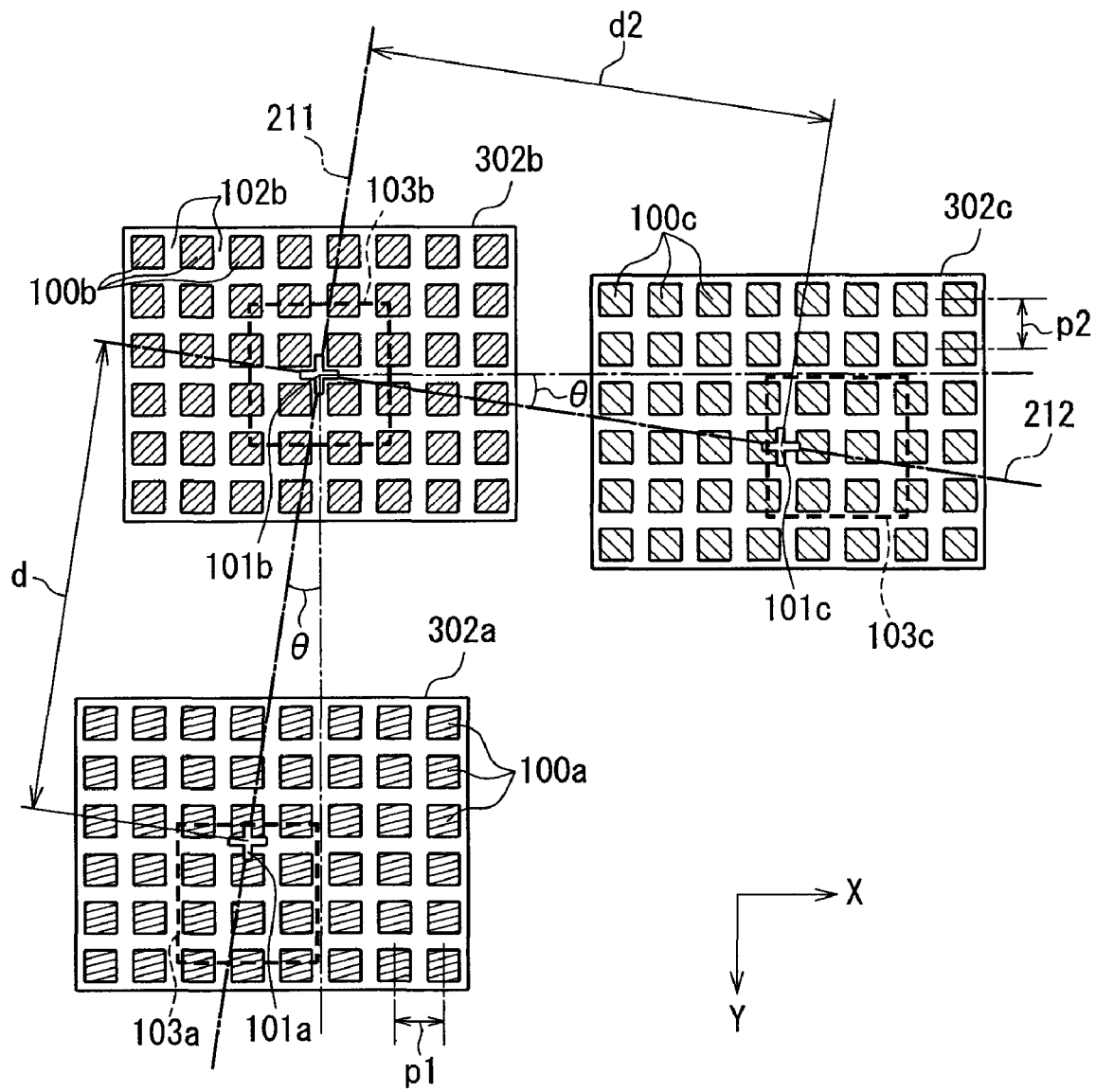
FIG. 2 is a plan view showing a positional relationship between optical axes of lenses and pixels in imaging regions in the imaging apparatus according to Embodiment 1 of the present invention.

FIG. 2 is a plan view showing the positional relationship between the optical axes of the lenses and the pixels in the imaging regions, taken along a direction parallel with the optical axes.

Numerals 100a, 100b and 100c denote pixels arranged in the imaging regions 302a, 302b and 302c. Since the imaging regions 302a, 302b and 302c are formed by dividing the effective pixel region of the single imaging device as described above, an arrangement direction and a pixel pitch of the pixels 100a, 100b and 100c in the respective imaging regions 302a, 302b and 302c are the same among the imaging regions 302a, 302b and 302c. In FIG. 2, pixels outside the imaging regions 302a, 302b and 302c are omitted. As shown in the figure, the pixels 100a, 100b and 100c are arranged in a matrix along vertical and horizontal directions. A direction parallel with the vertical arrangement direction (a first arrangement direction) is given by a Y axis, and a direction parallel with the horizontal arrangement direction (a second arrangement direction) is given by an X axis. Then, a direction parallel with the optical axes 300a, 300b and 300c is given by a Z axis. The X axis, the Y axis and the Z axis cross at right angles to each other.

Numeral 101a, 101b and 101c denote intersection points of the optical axes 300a, 300b and 300c of the lenses 301a, 301b and 301c and the imaging regions 302a, 302b and 302c, respectively.

The angle that the first straight line 211 connecting the intersection points 101b and 101a forms with the first arrangement direction of the pixels (the Y axis) is given by $\theta$ ($\theta \leq 90°$). Assuming that the three lenses 301a, 301b and 301c are integrally-formed in the lens array 300 without any errors, the angle that the second straight line 212 connecting the intersection points 101b and 101c forms with the second arrangement direction of the pixels (the X axis) also is $\theta$.

When d indicates the distance between the intersection points 101b and 101a (namely, the distance between the optical axes 300b and 300a), the intersection point 101a is shifted from the intersection point 101b by d×sin $\theta$ in the X-axis direction. If this amount of shifting is an odd multiple of one-half a pixel pitch p1 in the X-axis direction of the imaging device, the image information converted by the imaging region 302a serves as information of portions 102b between the pixels in the X-axis direction of the image information converted by the imaging region 302b.

Numerals 103a, 103b and 103c denote subject images of a subject located on the optical axis 300b that are formed by the lenses 301a, 301b and 301c. The positions of the subject images 103a, 103b and 103c vary according to the positions of the optical axes 300a, 300b and 300c of the lenses and the subject distance (the subject distance A in FIG. 16A). Thus, due to parallax, the subject image 103a formed by the lens 301a is formed at a position shifted from the intersection point 101a to a side away from the intersection point 101b along the direction of the first straight line 211 connecting the intersection points 101b and 101a. Since the first straight line 211 is not parallel with the Y axis, the position at which the subject image 103a is formed varies in the X-axis direction and the Y-axis direction according to the subject distance. In the present embodiment, the distance d between the optical axes is sufficiently larger than the pixel pitches p1 and p2 along the X-axis direction and the Y-axis direction. Therefore, as long as the angle θ is sufficiently small, the amount that the variation in the subject distance causes the position at which the subject image 103a is formed to vary along the X-axis direction is so small that it can be ignored. Accordingly, by utilizing the shifting of the subject image 103a with respect to the subject image 103b along the X-axis direction, it always is possible to achieve the shifted pixel arrangement in the X-axis direction regardless of the subject distance, thereby achieving a higher resolution in the X-axis direction.

Furthermore, in order to achieve the shifted pixel arrangement also in the Y-axis direction, it is appropriate that d2=(p1/p2)×d be satisfied, where p2 indicates a pixel pitch in the Y-axis direction and d2 indicates the distance between the intersection points 101b and 101c (namely, the distance between the optical axes 300b and 300c). This allows the relationship similar to that in the above-described shifted pixel arrangement in the X-axis direction between the imaging regions 302b and 302a to be established in the Y-axis direction between the imaging regions 302b and 302c. Thus, a higher resolution can be achieved in the X-axis direction and the Y-axis direction regardless of the subject distance.

Although FIG. 2 has illustrated an example in which the lens array 300 is rotated clockwise by the angle θ with respect to the imaging device around the optical axis 300b, this is intended to facilitate understanding. The present invention is not limited to this. What is important is to set the angle θ so that the above-described shifted pixel arrangement is achieved in the X-axis direction and the Y-axis direction. The position of an axis of rotation and the relative rotational direction may be different from the above.

Variations in the temperature of an image capturing environment cause the lens array 300 to expand (or contract) thermally. When the temperature rises from room temperature, the lens array 300 expands substantially isotropically, so that the distances d and d2 between the optical axes 300a, 300b and 300c of the lenses increase. However, since the above-described angle θ remains unchanged and is sufficiently small, the relationship of the shifted pixel arrangement described above is maintained. Thus, the shifted pixel arrangement in the imaging apparatus according to the present invention is impervious to the variations in the distances d and d2 between the optical axes of the lenses caused by the temperature variation of the surrounding environment.

The imaging regions 302a, 302b and 302c convert the subject images respectively formed therein into pieces of image information. After the resultant three pieces of image information are subjected to parallax correction, they are synthesized so as to obtain a single piece of image information. This computation processing will be described in the following.

First, a parallax amount deriving means 303 calculates a parallax amount between the pieces of image information (the shifting amount S in FIG. 16A) for the parallax correction.

The parallax amount can be calculated if the subject distance is known. However, the introduction of a new sensor for measuring the subject distance makes it difficult to reduce the size of the apparatus. Accordingly, in the present embodiment, two pieces of image information are compared directly, and the shifting amount between them is determined, thereby obtaining the parallax amount. The pieces of image information are compared by calculating the correlation between them. The image information is expressed as a group of pieces of brightness information distributed in a matrix along the X-axis direction and the Y-axis direction, and the brightness of a pixel, which is the k-th pixel in the X-axis direction and the l-th pixel in the Y-axis direction, is given by I(k, l). Since the pixels are finite, k and l are integers. Assuming the brightness of a pixel in one piece of the image information to be referred to (in the following, referred to as the "reference image information") of the two pieces of image information that are to be compared as I1(k, l) and the brightness of a pixel in the piece of the image information to be compared (in the following, referred to as the "compared image information") as I2(k+m, l+n), the correlation R(m, n) between the reference image information and a piece of image information obtained by shifting the compared image information by m pixels along the X-axis direction and n pixels along the Y-axis direction is calculated by the formula below.

$$R(m, n) = \frac{\sum_k \sum_l (I1(k, l) - \overline{I1})(I2(k+m, l+n) - \overline{I2})}{\sqrt{\sum_k \sum_l (I1(k, l) - \overline{I1})^2} \sqrt{\sum_k \sum_l (I2(k+m, l+n) - \overline{I2})^2}} \quad \text{[Formula 2]}$$

When the reference image information and the piece of image information obtained by shifting the compared image information by m pixels along the X-axis direction and n pixels along the Y-axis direction are similar, the correlation R(m, n) becomes close to 1. Conversely, when they are different, the correlation R(m, n) becomes small. While changing m and n sequentially, R(m, n) is calculated. When R(m, n) becomes closest to 1, m and n indicate the parallax amount (shifting amount) between the reference image information and the compared image information. It should be noted that m and n are not limited to integers. For example, in the reference image information and the compared image information, if the brightness at a position between pixels is calculated by interpolation based on the brightnesses of the surrounding pixels, the parallax amount at the decimal level can be calculated with a high resolving power. As the interpolation method of the pixels, known various methods such as bi-linear interpolation, bi-cubic interpolation and cubic convolution interpolation can be employed. For example, in the case of employing the bi-linear interpolation, the brightness I(u, v) at a position where X=u and Y=v between the pixels can be calculated by the formula below.

$$I(u, v) = [(l+1) - v \quad v - l] \begin{bmatrix} I(k, l) & I(k+1, l) \\ I(k, l+1) & I(k+1, l+1) \end{bmatrix} \begin{bmatrix} (k+1) - u \\ u - k \end{bmatrix} \quad \text{[Formula 3]}$$

Next, an image synthesizing means 304 synthesizes the two pieces of image information. Prior to the synthesis, one piece of image information is moved by the parallax amount obtained above in the X-axis direction and the Y-axis direction between the two pieces of image information (parallax correction).

Figure 3:
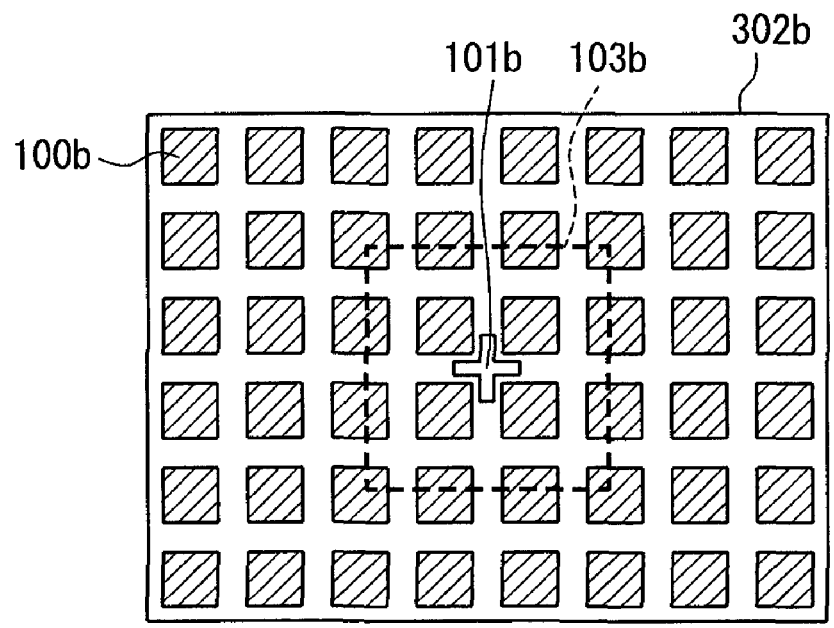
FIG. 3 is a plan view for describing image information synthesis in the imaging apparatus according to Embodiment 1 of the present invention.
Figure 3:
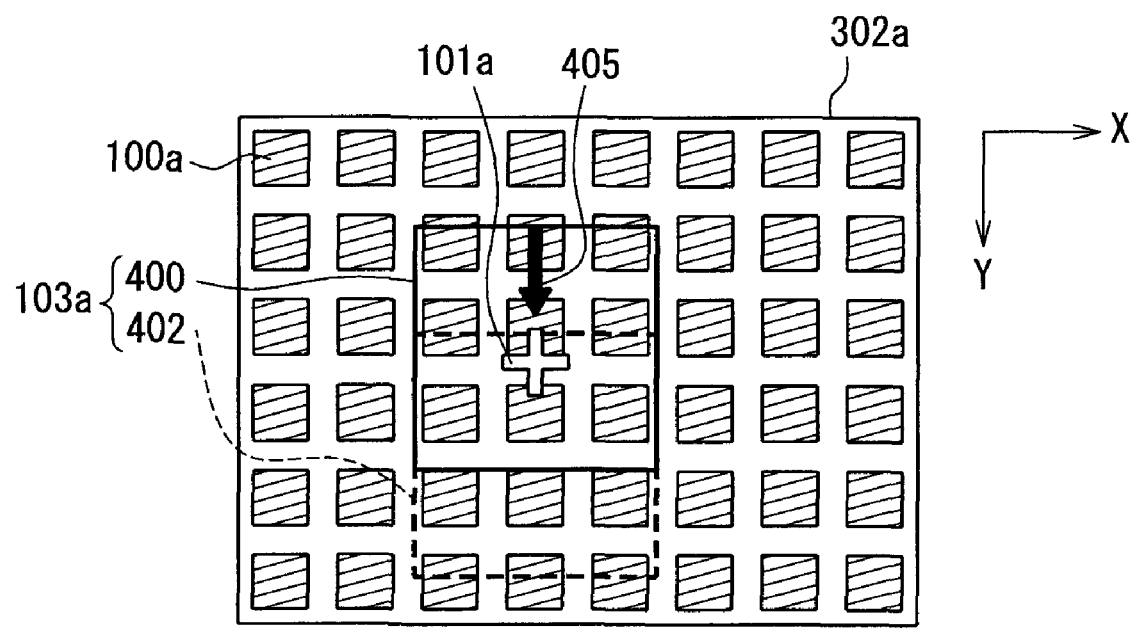

FIG. 3 is a plan view showing the imaging regions 302b and 302a and the subject images 103b and 103a formed therein in a state achieved by moving the imaging regions 302b and 302a in the X-axis direction so that the intersection points 101b and 101a are aligned in a single straight line parallel with the Y axis.

Figure 4:
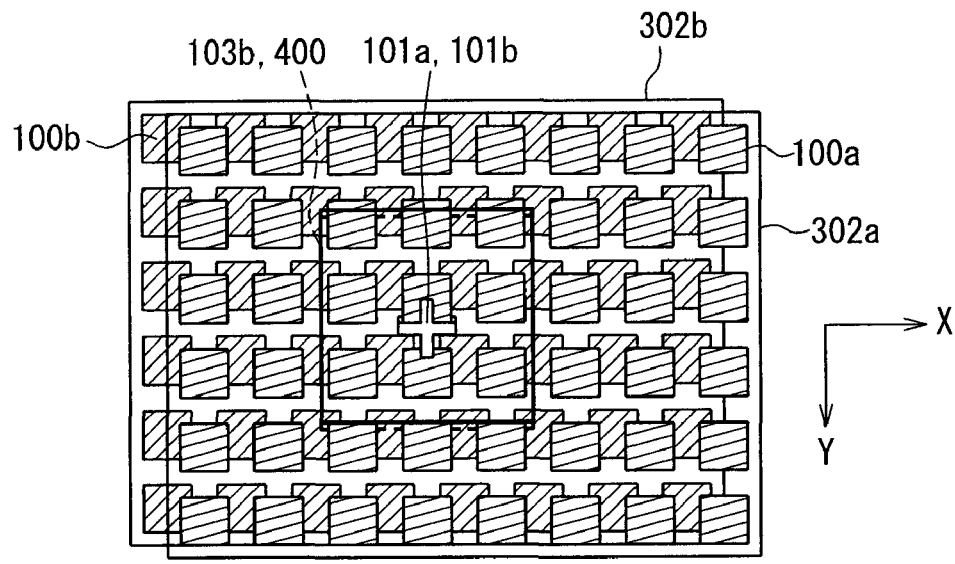
FIG. 4 is a plan view showing the image information synthesis when an image of a distant subject is captured.
Figure 16A:
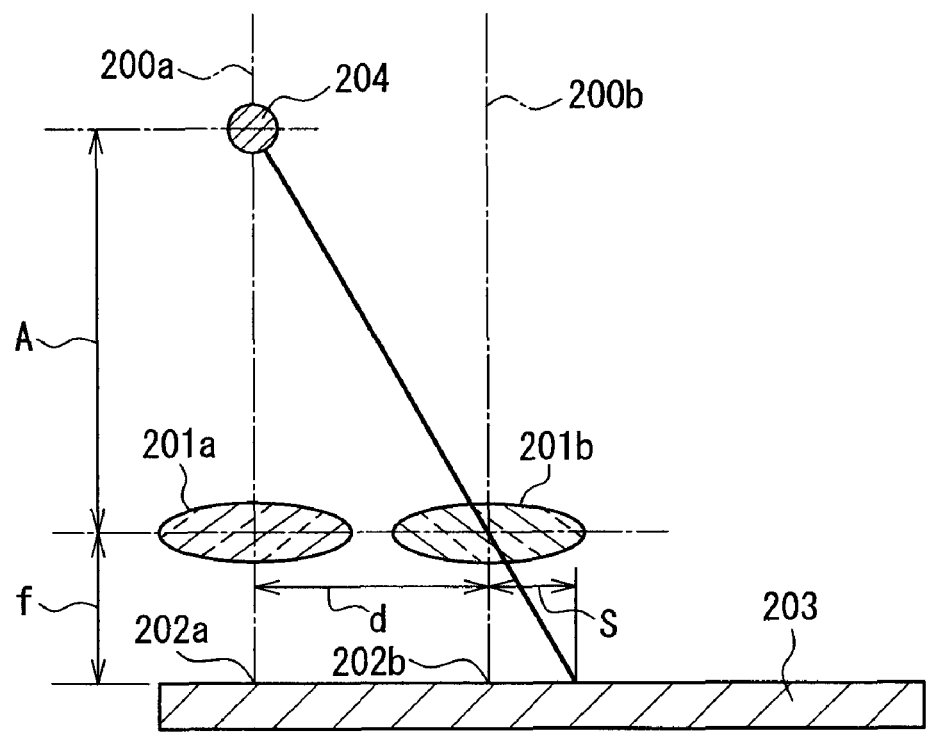
FIG. 16A is a side view showing a positional relationship among a plurality of lenses, a subject and subject images in a compound-eye imaging apparatus.
Figure 16B:
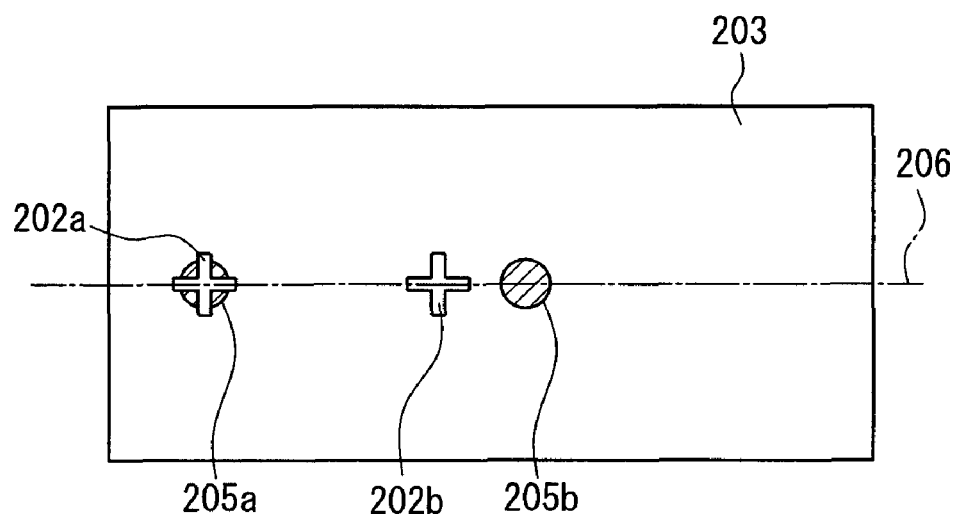
FIG. 16B is a plan view showing a positional relationship between optical axes of the plurality of lenses and the subject images in the compound-eye imaging apparatus.

As described in FIGS. 16A and 16B, the shifting amount S of the subject image due to parallax is inversely proportional to the subject distance A, and it can be ignored if the subject distance A is sufficiently large. In this case, as shown in FIG. 3, an image of the subject on the optical axis 300b is formed as the subject image 103b on the imaging region 302b and formed at a position indicated by a solid line 400 on the imaging region 302a. In other words, the relative positional relationship of the subject image 103b with respect to the intersection point 101b in the imaging region 302b and that of the position 400 at which the subject image is formed with respect to the intersection point 101a in the imaging region 302a are substantially the same. In this case, as shown in FIG. 4, the image information obtained from the imaging region 302b and that obtained from the imaging region 302a are superposed so that the intersection points 101b and 101a match. This allows the subject image 103b on the imaging region 302b and the subject image 103a on the imaging region 302a to be superposed with substantially no displacement. At this time, the pixels 100b in the imaging region 302b and the pixels 100a in the imaging region 302a are shifted from each other by an odd multiple of one-half the pixel pitch p1 along the X-axis direction. Thus, the resolution of the synthesized image in the X-axis direction improves.

Figure 5:
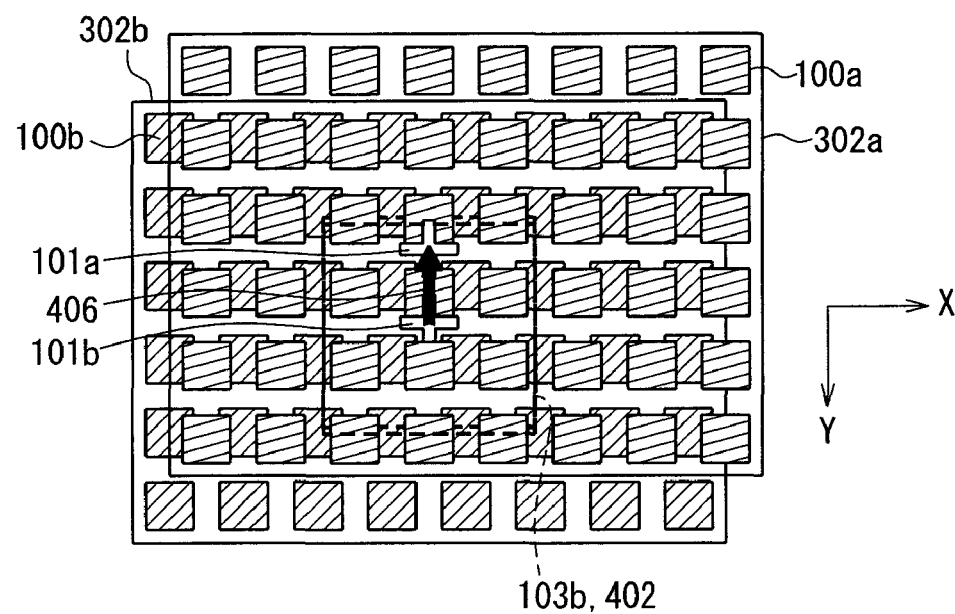
FIG. 5 is a plan view showing the image information synthesis when an image of a near subject is captured.

When the subject distance is small, as shown in FIG. 3, an image of the subject on the optical axis 300b is formed as the subject image 103b on the imaging region 302b and formed at a position indicated by a broken line 402 on the imaging region 302a. In other words, the relative positional relationship of the subject image 103b with respect to the intersection point 101b in the imaging region 302b and that of the position 402 at which the subject image is formed with respect to the intersection point 101a in the imaging region 302a are different. As described with reference to FIG. 2, the subject image 103a is formed at a position shifted from the intersection point 101a to a side away from the intersection point 101b along the direction of the first straight line 211 connecting the intersection points 101b and 101a. Here, the shifting of the position 402 at which the subject image 103a is formed when the subject distance is small from the position 400 at which the subject image 103a is formed when the subject distance is large (the parallax) is expressed by a vector 405. In this case, as shown in FIG. 5, the intersection point 101a is moved relative to the intersection point 101b by an inverse vector 406 of this vector 405, thereby superposing the image information obtained from the imaging region 302b and that obtained from the imaging region 302a. This allows the subject image 103b on the imaging region 302b and the subject image 103a on the imaging region 302a to be superposed with substantially no displacement. At this time, the pixels 100b in the imaging region 302b and the pixels 100a in the imaging region 302a also are shifted from each other by an odd multiple of one-half the pixel pitch p1 along the X-axis direction. Thus, the resolution of the synthesized image in the X-axis direction improves.

As described above, by performing the synthesis after the parallax correction, it is possible to obtain an image with improved resolution in the X-axis direction regardless of the subject distance. Incidentally, the pixel positions in the Y-axis direction sometimes might not match depending on the parallax amount. In such cases, the pixel positions can be corrected to an appropriate position by interpolation such as linear interpolation.

The parallax correction and the synthesis similar to the above are conducted on the image information obtained from the imaging region 302b and that obtained from the imaging region 302c. This makes it possible to obtain an image with improved resolution in the Y-axis direction regardless of the subject distance.

As described above, by synthesizing the image information obtained from the imaging region 302b with the image information obtained from the imaging region 302a and the image information obtained from the imaging region 302c, an image whose resolution is raised in the X-axis direction and the Y-axis direction can be obtained.

In the present invention, the pixel pitch p1 in the X-axis direction and the pixel pitch p2 in the Y-axis direction may be the same or different. For example, it is possible to combine a plurality of imaging devices to form a single imaging region or to use separate imaging devices for individual imaging regions. In any case, it is possible to obtain a high-resolution image regardless of the subject distance by performing the pixel shifting in the direction perpendicular to the direction in which the pixels are arranged and further to adjust the amount of pixel shifting by relative rotation between the plurality of imaging regions and the lens array.

Example 1

The following is a description of an example corresponding to Embodiment 1.

Figure 6A:
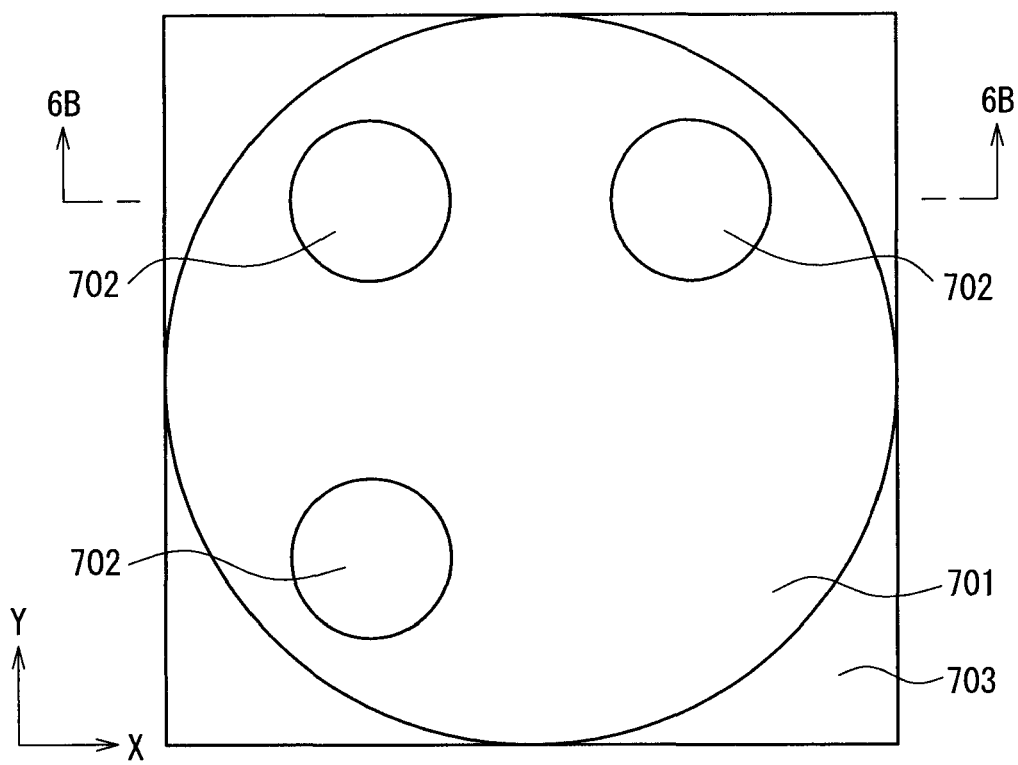
FIG. 6A is a plan view showing an imaging apparatus according to Example 1 of the present invention.
Figure 6B:
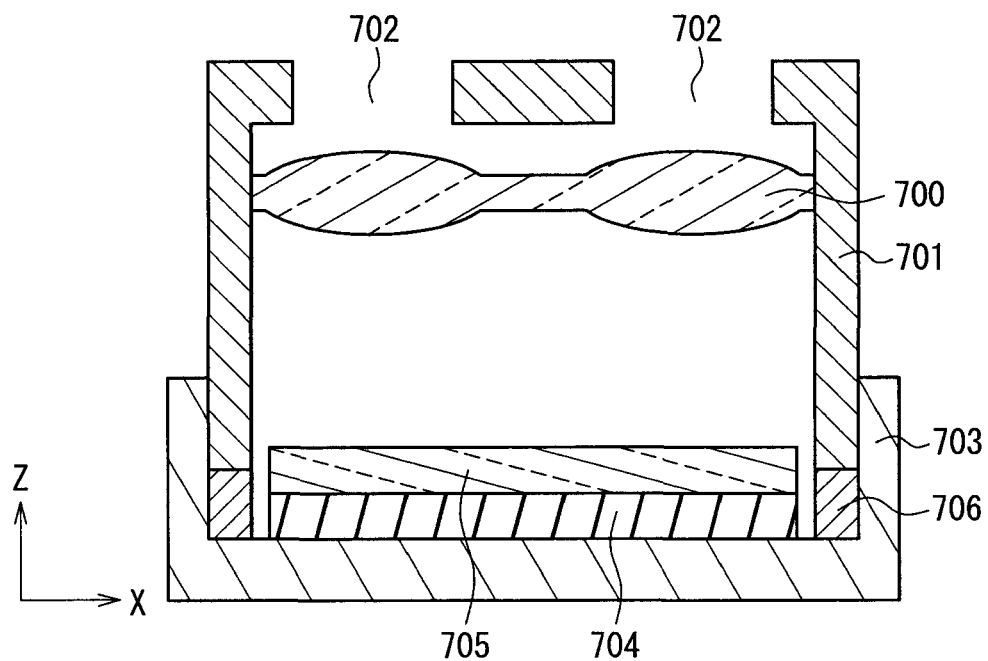
FIG. 6B is a sectional view thereof taken along a line 6B-6B in FIG. 6A.

FIG. 6A is a plan view showing an imaging apparatus according to Example 1 viewed along a direction parallel with optical axes, and FIG. 6B is a sectional view thereof taken along a line 6B-6B in FIG. 6A. Numeral 700 denotes a lens array having three lenses that are integrally-formed using an acrylic resin. As shown in FIG. 6A, the three lenses were arranged so that their optical axes were located at three vertices of a square whose one side d was 2 mm long. All of the lenses were designed so that their optical characteristics were optimal with respect to green wavelength light. In the Z-axis direction, the distance from the lens center to the image forming plane was 2.5 mm. The lens array 700 was held by a cylindrical barrel 701. A surface of the barrel 701 facing the subject was provided with three apertures 702 corresponding to the positions of the lenses. A portion of a base 703 to be fitted with the barrel 701 was provided with a circular recess (a groove). The barrel 701 was rotated along this recess around a center axis of the barrel 701 relative to the base 703, thereby making an adjustment so that the above-described shifted pixel arrangement was achieved between the subject images respectively formed by the three lenses and the pixels in an imaging device 704.

The imaging device 704 was fixed onto the base 703. The imaging device 704 was a 2,000-pixel (in the X-axis direction)×2,000-pixel (in the Y-axis direction) CCD whose pixel pitches p1 and p2 in the X-axis direction and the Y-axis direction were both 2 µm. In an effective pixel region of this imaging device 704, three 800-pixel (in the X-axis direction)×600-pixel (in the Y-axis direction) regions in which the three lenses respectively form subject images were used as imaging regions. Since the distance between the optical axes of the lenses was 2 mm and the pixel pitches p1 and p2 were 2 µm, the angle θ that the straight line connecting the optical axes of a pair of the lenses forms with the direction in which the pixels are arranged when viewed along a direction parallel with the optical axes (see FIG. 2) was set to $5 \times 10^{-4}$ rad. In this way, it was possible to achieve the shifted pixel arrangement between all of the three subject images respectively formed by the three lenses and all of the pixels in the three imaging regions corresponding to these subject images.

In order to take out green image information alone, a color filter 705 transmitting light in a green wavelength range was provided on the subject-side surface of the imaging device 704. A spacer 706 was interposed between the barrel 701 and the base 703, thus achieving accurate positioning between the image forming planes of the lenses and a photodetector surface of the imaging device 704.

Using the imaging apparatus produced as above, the limiting resolution was evaluated with a resolution chart placed at a subject distance of 1 m. The limiting resolution of a 800-pixel (in the X-axis direction)×600-pixel (in the Y-axis direction) image captured by only one lens was 550 TV lines in both of the X-axis direction and the Y-axis direction. On the other hand, the limiting resolution of the image obtained by synthesizing the three pieces of image information obtained from the three imaging regions by the method according to the present invention was 1,000 TV lines in both of the X-axis direction and the Y-axis direction, which was about 1.8 times higher than the above. When the limiting resolution was evaluated while varying the subject distance from 10 cm to 3 m, the limiting resolution in the case of synthesizing the three pieces of image information was 1.5 to 1.8 times as high as that in the case of capturing with only one lens at every distance.

Further, the relationship between the pixel shifting amount d×sin θ (see FIG. 2) and the limiting resolution was examined while varying the above-described angle θ. When d×sin θ was in the range of 0.5×p1±0.25×p1, the limiting resolution improved in the X-axis direction. When d×sin θ was in the range of 0.5×p2±0.25×p2, the limiting resolution improved in the Y-axis direction. In particular, when d×sin θ was in the ranges of 0.5×p1±0.1×p1 and 0.5×p2±0.1×p2, the resolution improved stably.

Moreover, the produced imaging apparatus was placed in a thermostat, and the characteristics thereof were determined with varying temperature. The limiting resolution in the case of synthesizing the three pieces of image information was at least 1.5 times as high as that in the case of capturing with only one lens from −10° C. to 40° C., thus confirming that the present invention was effective for the temperature variation.

Embodiment 2

Embodiment 1 has described the imaging apparatus using the lens array 300 including the three lenses 301a, 301b and 303c that are integrally-formed without any error in their relative positional relationship. However, if any forming error occurs in the relative positional relationship between a plurality of the lenses in an actual production of the lens array, it is difficult to correct. Thus, the lens array has to be formed at an accuracy finer than the pixel pitch in the imaging region, requiring a very high forming accuracy, so that a low-cost mass-production might become difficult.

On the other hand, it indeed is possible to prepare plural lenses separately and assemble these plural lenses while making a fine adjustment to the positional relationship with the corresponding plural imaging regions so that a desired shifted pixel arrangement is achieved, but this involves many adjusting processes and is not suitable for mass-production.

Embodiment 2 provides an imaging apparatus obtained by adding a function of compensating for a forming error of the lens array to the imaging apparatus of Embodiment 1.

Figure 7A:
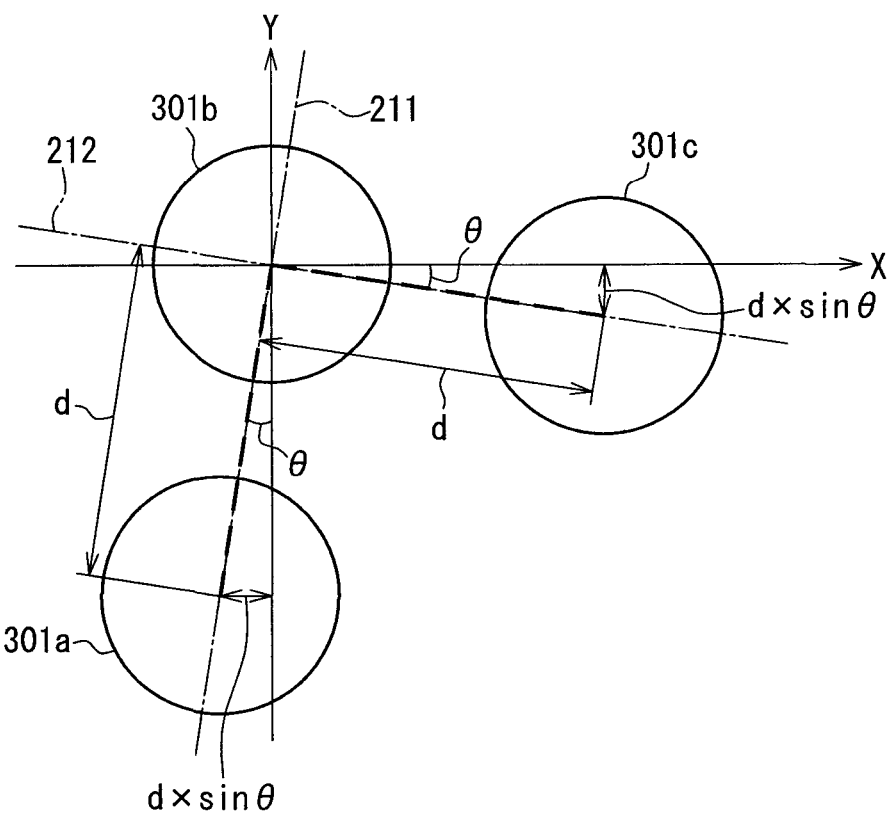
FIG. 7A is a plan view showing an arrangement of the lenses in the imaging apparatus according to Embodiment 1 of the present invention.

FIG. 7A is a plan view showing an arrangement of the lenses in the imaging apparatus according to Embodiment 1. For simplicity of description, the description will be directed to the case where the distance between the optical axes of the lens 301b and the lens 301a and that between the optical axes of the lens 301b and the lens 301c are both d and the pixel pitches p1 and p2 in the X-axis direction and the Y-axis direction in the imaging region are both p. Accordingly, when the lens array is rotated by the angle θ, the amount that the optical axis of the lens 301a is shifted with respect to the optical axis of the lens 301b in the X-axis direction and the amount that the optical axis of the lens 301c is shifted with respect to the optical axis of the lens 301b in the Y-axis direction are both d×sin θ.

However, if the first straight line 211 connecting the optical axes of the lenses 301b and 301a and the second straight line 212 connecting the optical axes of the lenses 301b and 301c do not form an exact right angle due to forming errors, the above-noted two shifting amounts are not both d×sin θ. Accordingly, it sometimes is difficult to achieve both of the shifted pixel arrangement between two subject images formed respectively by the lenses 301b and 301a and the shifted pixel arrangement between two subject images formed respectively by the lenses 301b and 301c. In such cases, no matter how the angle θ is varied, an image whose resolution is raised in both of the X-axis direction and the Y-axis direction cannot be obtained.

Figure 7B:
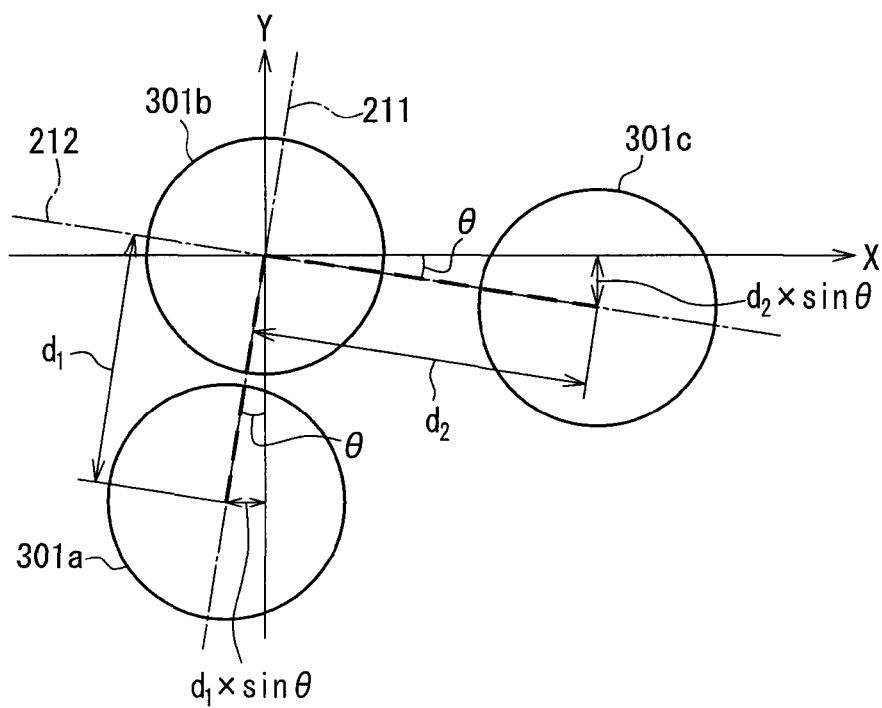
FIG. 7B is a plan view showing an arrangement of lenses in an imaging apparatus according to Embodiment 2 of the present invention.

FIG. 7B is a plan view showing an arrangement of the lenses in the imaging apparatus according to Embodiment 2. Similarly to FIG. 7A, the description will be directed to the case where the pixel pitches p1 and p2 in the X-axis direction and the Y-axis direction in the imaging region are both p. In Embodiment 2, the distance between the optical axes of the lens 301b and the lens 301a is d1, and that between the optical axes of the lens 301b and the lens 301c is d2(d2≠d1). Accordingly, when the lens array is rotated by the angle θ, the amount that the optical axis of the lens 301a is shifted with respect to the optical axis of the lens 301b in the X-axis direction (namely, the pixel shifting amount in the X-axis direction) is d1×sin θ, and the amount that the optical axis of the lens 301c is shifted with respect to the optical axis of the lens 301b in the Y-axis direction (namely, the pixel shifting amount in the Y-axis direction) is d2×sin θ. Since the pixel shifting amounts in the X-axis direction and the Y-axis direction are different as described above, they can be adjusted so as to be in the respective ranges of 0.5×p1±0.1×p1 and 0.5×p2±0.1×p2 at the same time, which achieve particularly high limiting resolution as described in Example 1, more easily even when the forming error of the lens array occurs. In other words, even when a production error occurs, it is possible to produce an imaging apparatus whose resolution can be raised easily and reliably in both of the X-axis direction and the Y-axis direction by adjusting the angle θ, so that the production becomes easier, leading to improved yield.

Unlike FIG. 7B, it also may be possible to make the distances d1 and d2 between the optical axes of the lenses equal to each other (d1=d2=d) and the pixel pitch p1 in the X-axis direction and the pixel pitch p2 in the Y-axis direction in the imaging region different from each other (p1≠p2). In this case, when a rotation angle for allowing the amount that the optical axis of the lens 301a is shifted with respect to the optical axis of the lens 301b in the X-axis direction (namely, the pixel shifting amount in the X-axis direction) to match one pixel pitch p1 in the X-axis direction is given by θ (namely, d×sin θ=p1), the amount that the optical axis of the lens 301c is shifted with respect to the optical axis of the lens 301b in the Y-axis direction (namely, the pixel shifting amount in the Y-axis direction) is d×sin θ, which does not match one pixel pitch p2 in the Y-axis direction. In other words, similarly to FIG. 7B, the ratio of the pixel shifting amount to the pixel pitch can be made different between the X-axis direction and the Y-axis direction. Accordingly, the pixel shifting amounts in the respective directions can be adjusted so as to be in the respective ranges of $0.5 \times p1 \pm 0.1 \times p1$ and $0.5 \times p2 \pm 0.1 \times p2$ at the same time, which achieve high limiting resolution, more easily even when the forming error of the lens array occurs.

Example 2

The following is a description of an example corresponding to Embodiment 2.

Figure 8A:
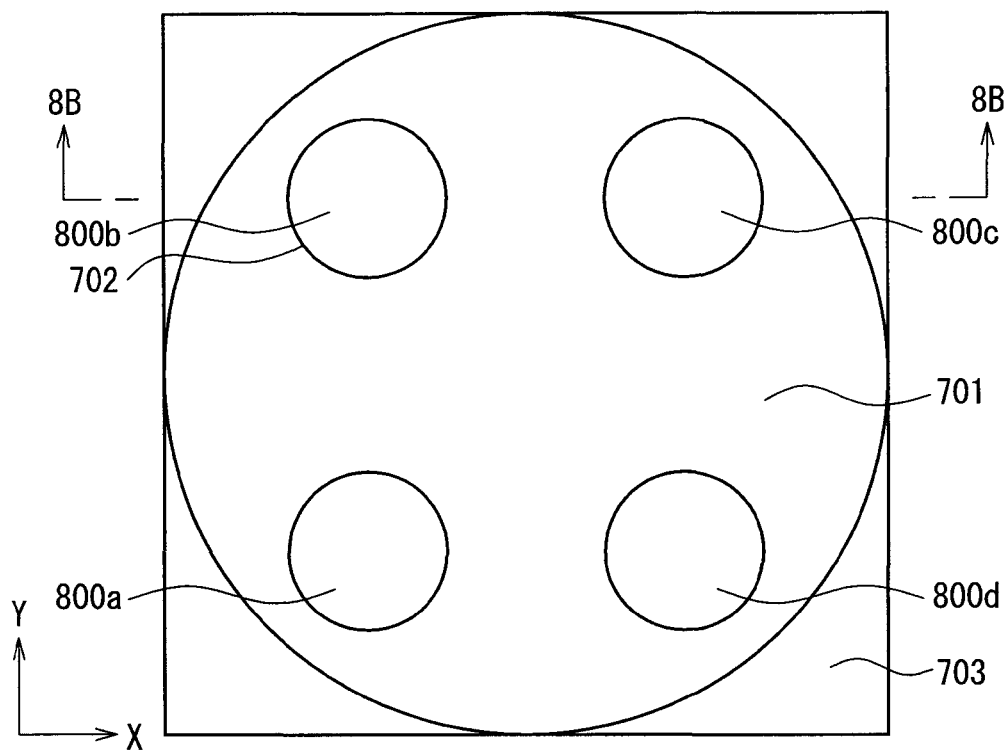
FIG. 8A is a plan view showing an imaging apparatus according to Example 2 of the present invention.
Figure 8B:
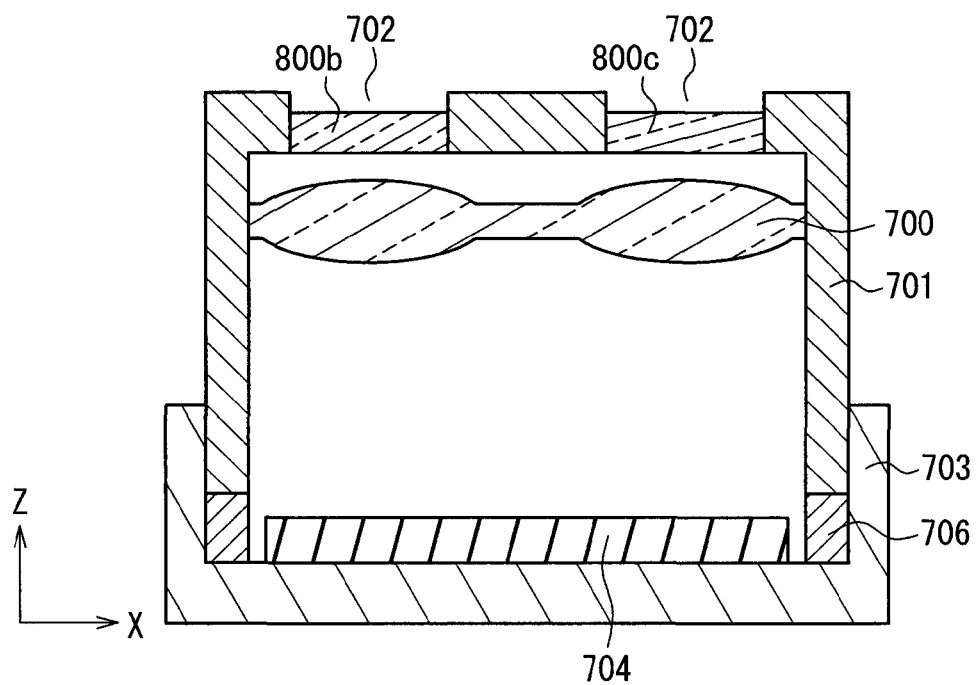
FIG. 8B is a sectional view thereof taken along a line 8B-8B in FIG. 8A.

FIG. 8A is a plan view showing an imaging apparatus according to Example 2 viewed along a direction parallel with optical axes, and FIG. 8B is a sectional view thereof taken along a line 8B-8B in FIG. 8A.

Example 2 is different from Example 1 (FIGS. 6A and 6B) in the following points. The lens array 700 was constituted by four lenses that were integrally-formed. As shown in FIG. 8A, the four lenses were arranged so that their optical axes were located at individual vertices of a rectangle whose shorter sides (with a length d1=1.5 mm) were substantially parallel with the Y axis and longer sides (with a length d2=2 mm) were substantially parallel with the X axis. No color filter was provided on the imaging device 704. Instead, color filters 800a, 800b, 800c and 800d were provided in four apertures 702 in the barrel 701 that corresponded to the four lenses. The diagonally-opposed color filters 800b and 800d transmitted light in a green wavelength range, the color filter 800a transmitted light in a red wavelength range, and the color filter 800c transmitted light in a blue wavelength range. Each of the lenses was designed so that its optical characteristics were optimal with respect to light at wavelengths of the light transmitted by the corresponding color filter. In an effective pixel region of the imaging device 704, four 800-pixel (in the X-axis direction)×600-pixel (in the Y-axis direction) regions in which the four lenses respectively formed subject images were used as imaging regions. In this manner, the imaging apparatus for synthesizing a color image was produced. Other than the above, the configuration was the same as that in FIGS. 6A and 6B. The same elements are assigned the same reference numerals, and the detailed description thereof will be omitted.

Two pieces of image information obtained from the two imaging regions corresponding to the two diagonally-opposed color filters 800b and 800d for transmitting light in the green wavelength range were compared, thereby calculating the parallax amount accurately. An X-axis component of this parallax amount indicated the parallax amount of blue image information obtained from the imaging region corresponding to the color filter 800c, and a Y-axis component thereof indicated the parallax amount of red image information obtained from the imaging region corresponding to the color filter 800a.

As described earlier, the pieces of image information of red (R), green (G) and blue (B) colors are known to be correlated in the local region of an image. In an imaging apparatus using an imaging device in which the color filters of three colors are in the Bayer arrangement, it is known that, utilizing such characteristics, information of the other two colors in a pixel having a filter of one color is estimated from color information of this pixel, thereby interpolating color information. In the present example, since the red image information and the blue image information were shifted from the two pieces of green image information by an amount substantially corresponding to an odd multiple of one-half the pixel pitch, the above-mentioned interpolation of the color information was applicable. In this way, the individual pieces of color information were superposed (synthesized) after achieving higher resolution, thereby obtaining a high-resolution color image.

Figure 9A:
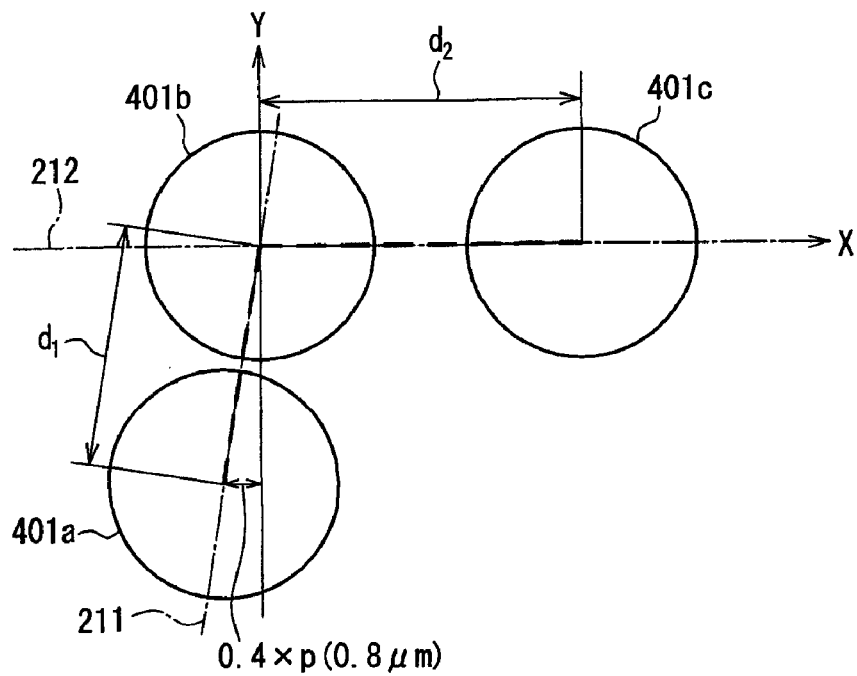
FIG. 9A is a plan view showing an arrangement of lenses constituting a lens array in the imaging apparatus according to Example 2 of the present invention.
Figure 9B:
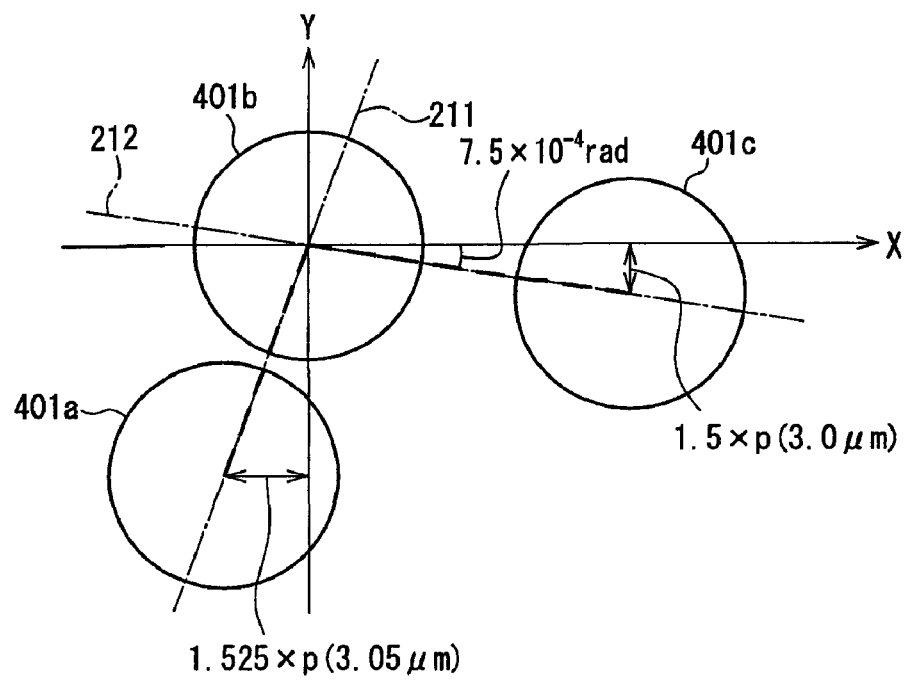
FIG. 9B is a plan view showing the arrangement of the lenses when the lens array has been rotated from the state shown in FIG. 9A in the imaging apparatus according to Example 2 of the present invention.

FIG. 9A shows an arrangement of the lenses in the lens array 700. In FIG. 9A, only three lenses (indicated by numerals 401a, 401b and 401c, respectively) corresponding to the color filters 800a, 800b and 800c of the four lenses are illustrated. Positions of the optical axes of these three lenses were measured accurately. In the case where the pixel pitches p1 and p2 in the X-axis direction and the Y-axis direction were both p (p1=p2=p=2 μm), the amount that the optical axis of the lens 401a was shifted with respect to the optical axis of the lens 401b in the X-axis direction was $0.4 \times p$ (=0.8 μm), with a straight line 212 connecting the optical axes of the lenses 401b and 401c being set to parallel with the X axis. When the lens array 700 was rotated clockwise with respect to the imaging device 704 by $7.5 \times 10^{-4}$ rad from this state, the amount that the optical axis of the lens 401c was shifted with respect to the optical axis of the lens 401b in the Y-axis direction was $1.5 \times p$ (=3.0 μm) and the amount that the optical axis of the lens 401a was shifted with respect to the optical axis of the lens 401b in the X-axis direction was $1.525 \times p$ (=3.05 μm) as shown in FIG. 9B. In other words, it was possible to set both of the shifting amounts to substantially an odd multiple of one-half the pixel pitch.

When the positions of the optical axes of the lenses in 100 lens arrays were measured, there were variations within the range of +2 μm from the designed positions. These lens arrays were each mounted in an imaging apparatus, and the angle of rotation of the lens array with respect to the imaging device was adjusted. The limiting resolution was evaluated similarly to Example 1. The limiting resolution of a 800-pixel (in the X-axis direction)×600-pixel (in the Y-axis direction) image captured by only one lens was 550 TV lines in both of the X-axis direction and the Y-axis direction. On the other hand, the limiting resolution of the color image obtained by synthesizing the four pieces of image information obtained from the four imaging regions always was 800 to 900 TV lines in both of the X-axis direction and the Y-axis direction in all the cases of using these lens arrays.

It should be noted that the arrangement of the color filters is not limited to the above-described example. For instance, numerals 800a and 800c may denote color filters transmitting light in the green wavelength range, numeral 800b may denote a color filter transmitting light in the red wavelength range, and numeral 800d may denote a color filter transmitting light in the blue wavelength range.

Comparative Example 1

In Comparative Example 1, the optical axes of the four lenses in Example 2 described above were arranged so as to be located substantially at individual vertices of a square whose one side d was 2 mm long. Other than the above, the configuration of the imaging apparatus and the processing of the image information were the same as those in Example 2.

As shown in FIG. 9A, in the case where the pixel pitches p1 and p2 in the X-axis direction and the Y-axis direction were both p (p1=p2=p=2 μm), the amount that the optical axis of the lens 401a was shifted with respect to the optical axis of the lens 401b in the X-axis direction was $0.4 \times p$ (=0.8 μm), with the straight line 212 connecting the optical axes of the lenses 401b and 401c being set to parallel with the X axis. In this case, no matter how the lens array 700 was rotated with respect to the imaging device 704, it was not possible to adjust both of the amount that the optical axis of the lens 401a was shifted with respect to the optical axis of the lens 401b in the X-axis direction and the amount that the optical axis of the lens 401c was shifted with respect to the optical axis of the lens 401b in the Y-axis direction to be within the range of 0.5×p+0.2×p at the same time.

The limiting resolution was evaluated similarly to Example 2. The limiting resolution of a color image obtained by synthesizing four pieces of image information obtained from the four imaging regions often varied between the X-axis direction and the Y-axis direction. For example, when the angle of rotation of the lens array 700 with respect to the imaging device 704 was at a certain value, the limiting resolution was 900 TV lines in the X-axis direction and 600 TV lines in the Y-axis direction, indicating that the resolution was not raised in the Y-axis direction.

This results for the following reason. In Comparative Example 1, since the distances d1 and d2 between the optical axes of the lenses were equal to each other, no matter how the lens array 700 was rotated with respect to the imaging device 704, the amount that the optical axis of the lens 401a was shifted with respect to the optical axis of the lens 401b in the X-axis direction and the amount that the optical axis of the lens 401c was shifted with respect to the optical axis of the lens 401b in the Y-axis direction remained the same. Consequently, it sometimes was impossible to set both of these shifting amounts to substantially odd multiple of one-half the pixel pitch depending on the forming error of the lens array.

Embodiment 3

The present embodiment provides an imaging apparatus achieving both of the determination of a subject distance and the higher image resolution.

As described referring to FIG. 16A, in the compound-eye imaging apparatus, the parallax due to the difference in subject distance is generated in the direction of a straight line connecting the optical axes of a pair of lenses. In contrast, in the present invention, with the shifted pixel arrangement in the direction perpendicular to the straight line connecting the optical axes of the pair of lenses, a higher image resolution is achieved. As described above, in the present invention, since the direction in which the parallax is generated and the direction of the shifted pixel arrangement are different, it is possible to achieve both of the determination of the subject distance (namely, the parallax amount) and the higher image resolution.

In the present embodiment, the parallax amount is determined by dividing an image to be referred to (a reference image) into a plurality of blocks and examining with which portion of an image to be compared (a compared image) each of the blocks correlates to the highest degree, similarly to Embodiment 1. The shifted pixel arrangement of the present invention causes the compared image to move with respect to the reference image in a direction perpendicular to the straight line connecting the optical axes of a pair of the lenses. Accordingly, if an image is searched for along the straight line connecting the optical axes of the pair of lenses similarly to the method of determining the distance in a usual compound-eye imaging apparatus, the correlation is poor, so that it becomes readily difficult to detect the parallax highly accurately. On the other hand, if an image is searched for along a straight line shifted by the amount of pixel shifting due to the shifted pixel arrangement in a direction perpendicular to the straight line connecting the optical axes of a pair of lenses, the influence of the shifted pixel arrangement of the present invention is corrected, thereby making it possible to improve an accuracy for detecting the parallax amount. Thus, under the shifted pixel arrangement of the present invention, the subject distance can be determined highly accurately.

Example 3

The following is a description of an example corresponding to Embodiment 3. Example 3 achieves both of the determination of a subject distance and the capturing of a high-resolution image.

Figure 10A:
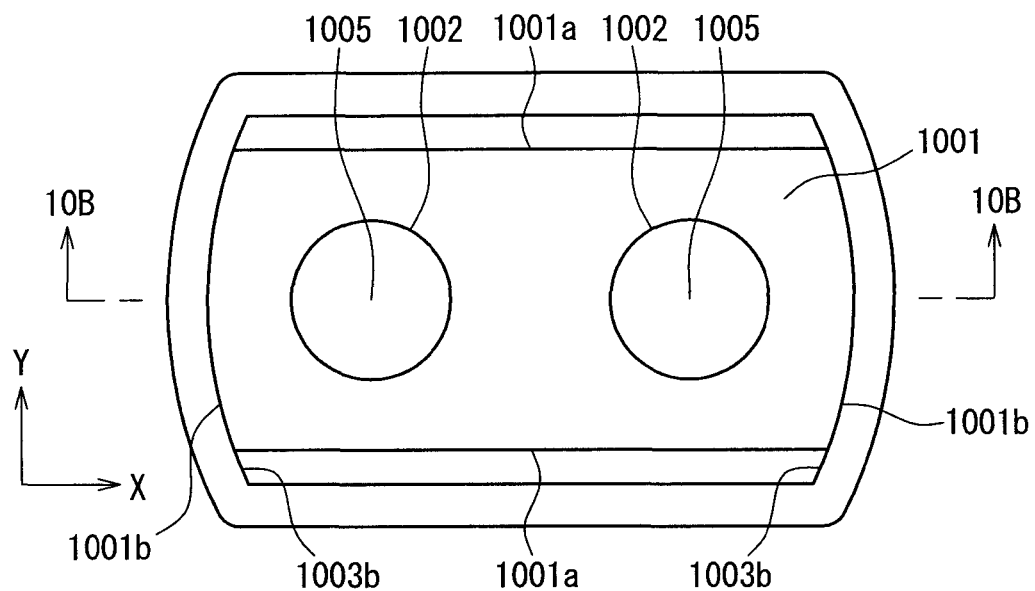
FIG. 10A is a plan view showing an imaging apparatus according to Example 3 of the present invention.
Figure 10B:
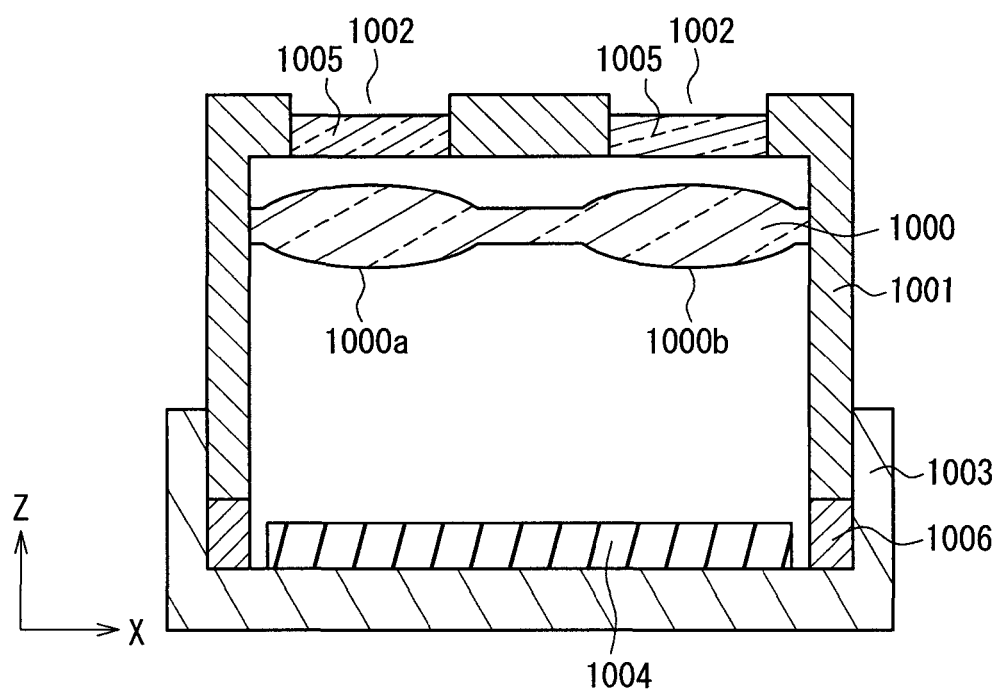
FIG. 10B is a sectional view thereof taken along a line 10B-10B in FIG. 10A.

FIG. 10A is a plan view showing an imaging apparatus according to Example 3 viewed along a direction parallel with optical axes, and FIG. 10B is a sectional view thereof taken along a line 10B-10B in FIG. 10A. A lens array 1000 having a pair of lenses 1000a and 1000b was integrally-formed. The distance between optical axes of the pair of lenses 1000a and 1000b was set to 3 mm. The lens array 1000 was held by a tube-like barrel 1001. A surface of the barrel 1001 facing the subject was provided with two apertures 1002 corresponding to the positions of the pair of lenses 1000a and 1000b. As shown in FIG. 10A, the shape of a plan view of an outer peripheral surface of the barrel 1001 viewed along a direction parallel with the optical axes was a deformed rectangle whose longer sides corresponded to a pair of straight lines 1001a and shorter sides corresponded to a pair of circular arcs 1001b connecting both ends of the pair of straight lines 1001a. A portion of a base 1003 to be fitted with the barrel 1001 was provided with a recess (a groove) with curved surfaces 1003b having the same curvature as the pair of circular arcs 1001b. The barrel 1001 was rotated along this recess around a center axis of the barrel 1001 relative to the base 1003, thereby making an adjustment so that the shifted pixel arrangement was achieved between a pair of subject images respectively formed by the pair of lenses 1000a and 1000b and the pixels in an imaging device 1004.

The imaging device 1004 was fixed onto the base 1003. The imaging device 1004 was a CCD whose pixel pitches p1 and p2 in the X-axis direction and the Y-axis direction were both 2.2 μm. A spacer 1006 was interposed between the barrel 1001 and the base 1003, thus achieving accurate positioning between the image forming planes of the lenses and a photodetector surface of the imaging device 1004.

The parallax due to the difference in subject distance is generated in a direction of the straight line connecting the optical axes of the pair of lenses 1000a and 1000b, namely, the X-axis direction. Thus, the angle θ that the straight line connecting the optical axes of the pair of lenses 1000a and 1000b formed with one of the directions in which the pixels were arranged was set to $3.6 \times 10^{-4}$ rad. This achieved the shifted pixel arrangement in the Y-axis direction with a pixel shifting amount of about 1.1 μm.

No color information is needed for determining the distance. Thus, the pair of apertures 1002 in the barrel 1001 were provided respectively with wavelength selection filters 1005 transmitting light in a green wavelength range. Two images formed by the pair of lenses 1000a and 1000b were compared, thereby determining the subject distance.

From the pair of images formed respectively by the pair of lenses 1000a and 1000b on the imaging device 1004, the parallax amount was determined as follows. That is, first, a whole of the image formed by the lens 1000b (the compared image) was moved by image transformation along the Y-axis direction by an amount corresponding to one-half the pixel pitch. Then, in the compared image, a position of a portion corresponding to a block in the image formed by the lens 1000a (the reference image) was searched for. The amount that this block in the reference image was shifted with respect to the position of the portion in the compared image corresponding to this block in the X-axis direction (namely, the parallax amount) was determined, thereby determining the subject distance.

An imaging apparatus according to Comparative Example 2, which was the same as that according to Example 3 except that the shifted pixel arrangement in the Y-axis direction was not carried out, was produced. When the imaging apparatus according to Example 3 and that according to Comparative Example 2 were compared in terms of the determination accuracy of the subject distance, they were not different significantly. On the other hand, when they were compared in terms of the limiting resolution of the synthesized image, the apparatus according to Example 3 achieved an image with a resolution 1.5 times as high as that of the apparatus according to Comparative Example 2.

In Example 3 described above, the filter transmitting light in the green wavelength range was used as the pair of wavelength selection filters 1005. However, this merely is an example, and the present invention is not limited thereto. As long as a filter selectively transmitting light in a specific wavelength range is used, the effect similar to the above can be obtained. For example, when filters transmitting infrared light are used as the pair of wavelength selection filters 1005, it is possible to achieve an imaging apparatus capable of determining the subject distance and capturing a high-resolution image even in the nighttime.

Example 4

The following is a description of another example corresponding to Embodiment 3. Example 4 achieves both of the determination of a subject distance and the capturing of a high-resolution image.

Figure 11A:
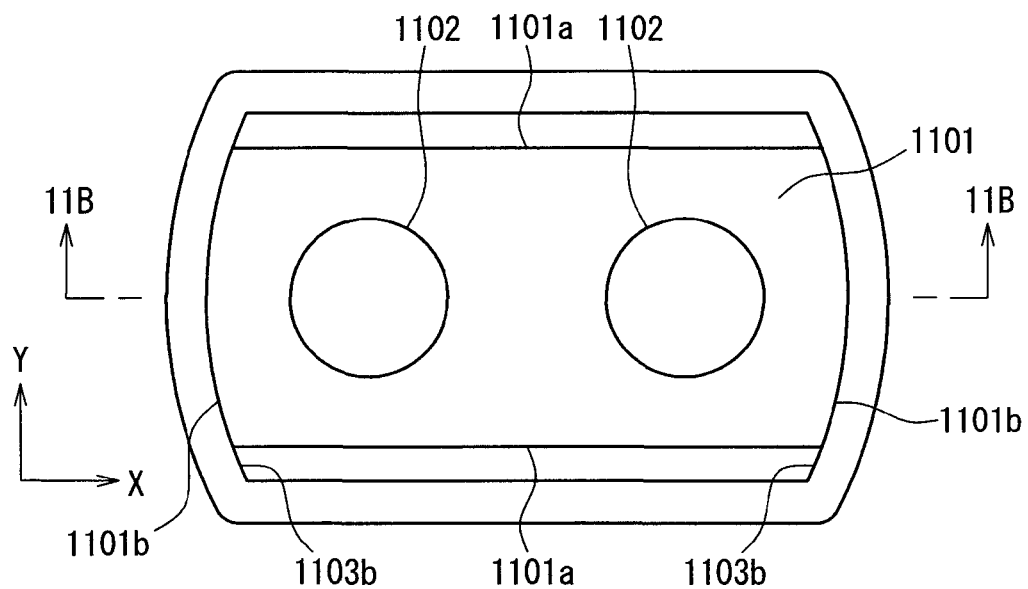
FIG. 11A is a plan view showing an imaging apparatus according to Example 4 of the present invention.
Figure 11B:
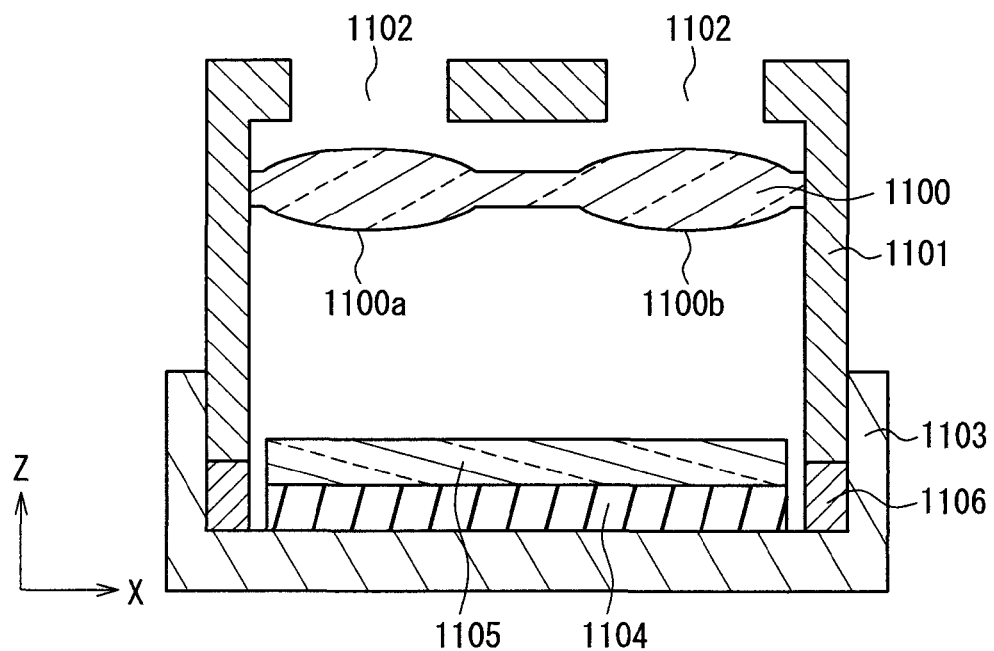
FIG. 11B is a sectional view thereof taken along a line 11B-11B in FIG. 11A.
Figure 15:
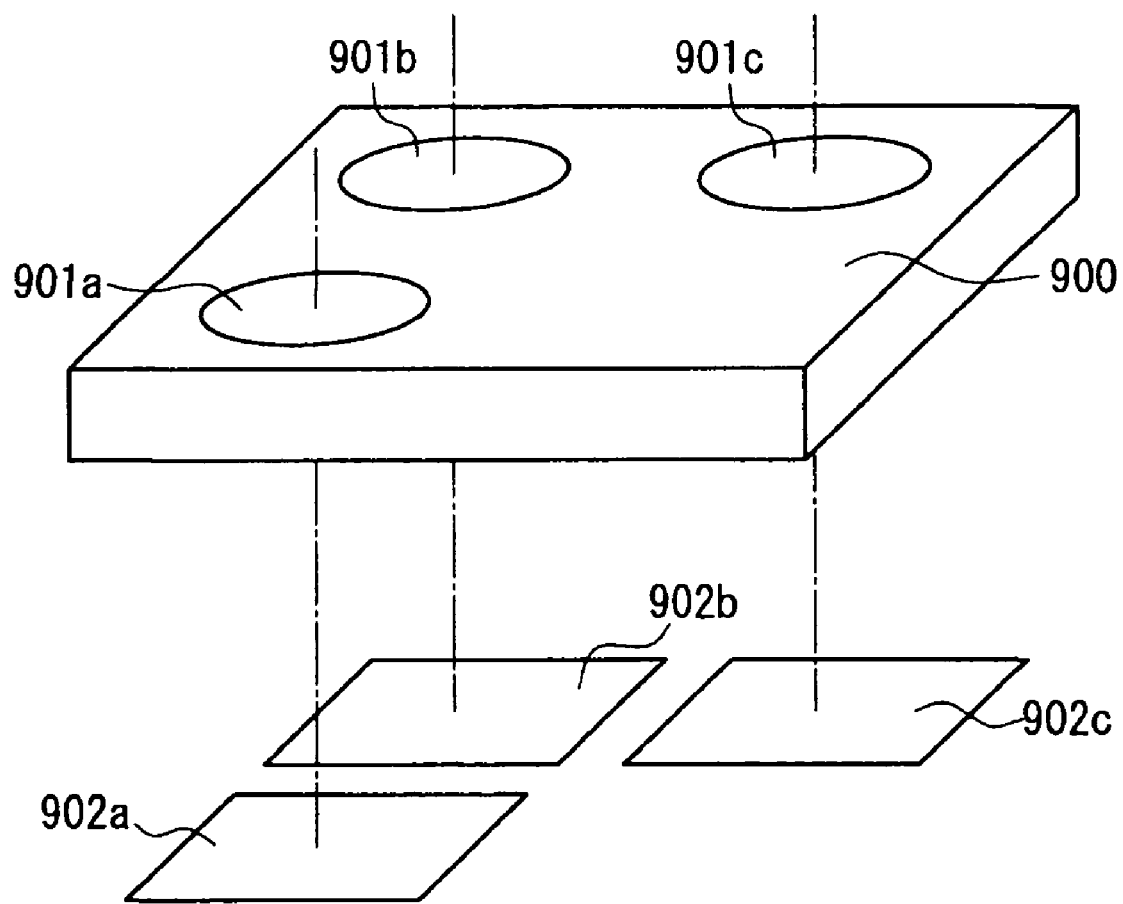
FIG. 15 is a perspective view showing a schematic configuration of an example of a conventional compound-eye imaging apparatus.

FIG. 11A is a plan view showing an imaging apparatus according to Example 4 viewed along a direction parallel with optical axes, and FIG. 11B is a sectional view thereof taken along a line 11B-11B in FIG. 11A. A lens array 1100 having a pair of lenses 1100a and 1100b with a diameter of 2.1 mm was integrally-formed. The distance between optical axes of the pair of lenses 1100a and 1100b was set to 3 mm. The lens array 1100 was held by a tube-like barrel 1101. A surface of the barrel 1101 facing the subject was provided with two apertures 1102 corresponding to the positions of the pair of lenses 1100a and 1100b. As shown in FIG. 11A, the shape of a plan view of an outer peripheral surface of the barrel 1101 viewed along a direction parallel with the optical axes was a deformed rectangle whose longer sides corresponded to a pair of straight lines 1101a and shorter sides corresponded to a pair of circular arcs 1101b connecting both ends of the pair of straight lines 1101a. A portion of a base 1103 to be fitted with the barrel 1101 was provided with a recess (a groove) with curved surfaces 1103b having the same curvature as the pair of circular arcs 1101b. The barrel 1101 was rotated along this recess around a center axis of the barrel 1101 relative to the base 1103, thereby making an adjustment so that the shifted pixel arrangement was achieved between a pair of subject images respectively formed by the pair of lenses 1100a and 1100b and the pixels in an imaging device 1104.

The imaging device 1104 was fixed onto the base 1103. The imaging device 1104 was a CCD whose pixel pitches p1 and p2 in the X-axis direction and the Y-axis direction were both 2.2 μm. A spacer 1106 was interposed between the barrel 1101 and the base 1103, thus achieving accurate positioning between the image forming planes of the lenses and a photodetector surface of the imaging device 1104.

The parallax due to the difference in subject distance is generated in a direction of the straight line connecting the optical axes of the pair of lenses 1100a and 1100b, namely, the X-axis direction. Thus, the angle θ that the straight line connecting the optical axes of the pair of lenses 1100a and 1100b formed with one of the directions in which the pixels were arranged was set to $3.6 \times 10^{-4}$ rad. This achieved the shifted pixel arrangement in the Y-axis direction with a pixel shifting amount of about 1.1 μm.

A lens including a refractor lens whose surface was provided with a diffraction grating, and a layer that was applied onto the diffraction grating and made of a material whose refractive index was different from a material of the refractor lens (in the following, referred to as the "refractive diffractive lens with an applied layer") was used as the lenses 1100a and 1100b. This made it possible to form a subject image by visible light on a photodetector surface of the imaging device 1104 with a little aberration, despite the fact that the lens was a single lens having a relatively small aperture.

A color filter 1105 was formed on the imaging device 1104. FIG. 12A shows an arrangement of the color filter on pixels in an imaging region corresponding to the lens 1100a, and FIG. 12B shows an arrangement of the color filter on pixels in an imaging region corresponding to the lens 1100b. As shown in FIGS. 12A and 12B, in Example 4, a color filter in which filters each transmitting any of red (R), green (G) and blue (B) colors were arranged in the Bayer arrangement in such a manner as to correspond to the pixel arrangement was used as the color filter 1105.

Each of the pixels in the imaging device 1104 can obtain only information of any one of red, green and blue. However, as described earlier, the pieces of image information of red, green and blue colors are known to be correlated in the local region of an image. In an imaging apparatus using an imaging device in which the color filters of three colors are in the Bayer arrangement, it is known that, utilizing such characteristics, information of the other two colors in a pixel having a filter of one color is estimated from color information of this pixel, thereby interpolating color information. By this known technique, pieces of color information of red, green and blue were obtained in the individual pixels. Accordingly, it was possible to achieve the shifted pixel arrangement for each color of red, green and blue. After a high-resolution image was obtained by synthesizing pieces of single color image information obtained from two imaging regions for each color of red, green and blue, a red high-resolution image, a green high-resolution image and a blue high-resolution image were synthesized further, thus obtaining a high-resolution color image.

On the other hand, a subject distance was determined from the single color image information obtained from the two imaging regions, similarly to Example 3.

In this manner, Example 4 achieved both of the capturing of a high-resolution color image and the determination of a subject distance.

Unlike Example 4 described above, it also may be possible to synthesize pieces of image information of the other colors with reference to the image information of green without interpolating color information and then interpolate color information in each of the pixels. In the case of interpolating the color information after the synthesis in this way, this interpolation can be performed using color information at a position closer to the pixel.

The color arrangement in the color filter 1105 provided on the imaging device 1104 is not limited to the Bayer arrangement shown in FIGS. 12A and 12B. As long as pieces of image information of three primary colors can be obtained, it is possible to capture a color image.

For example, it also may be possible to provide the imaging region corresponding to the lens 1100a with a color filter of the Bayer arrangement as shown in FIG. 13A and provide the imaging region corresponding to the lens 1100b with only filters transmitting green light as shown in FIG. 13B. This makes it possible to obtain more information of green to which a human eye is most sensitive, so that a high-resolution image can be obtained. In this case, it is preferable to use the above-mentioned refractive diffractive lens with an applied layer as the lens 1100a.

Alternatively, it also may be possible to provide the imaging region corresponding to the lens 1100a with a color filter in which filters transmitting green light and filters transmitting red light are arranged in a checkered pattern so as to correspond to the pixel arrangement as shown in FIG. 14A and provide the imaging region corresponding to the lens 1100b with a color filter in which filters transmitting green light and filters transmitting blue light are arranged in a checkered pattern so as to correspond to the pixel arrangement as shown in FIG. 14B. One imaging region receives light of two colors at wavelengths close to each other as described above, whereby it becomes easier to correct aberrations caused by the difference in refractive index due to the difference in wavelength compared with the case of receiving light of three primary colors of red, green and blue, so that the single lens can be designed more easily.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

INDUSTRIAL APPLICABILITY

Although the imaging apparatus according to the present invention can be utilized in any fields without particular limitation, it preferably is used, in particular, for a camera or the like to be mounted in mobile equipment because it can capture a high-resolution image despite its small thickness and size. Further, since the imaging apparatus according to the present invention can determine the distance to a subject, it also can be utilized for an input apparatus used in the fields of monitoring of vehicle surroundings, security, motion capture, endoscopes, etc.

The invention claimed is:

1. A compound-eye imaging apparatus, comprising:
a plurality of imaging optical lenses arranged in substantially the same plane; and
a plurality of imaging regions, each of which comprises a large number of pixels that are arranged in a plane perpendicular to respective optical axes of the plurality of imaging optical lenses, for converting into a plurality of pieces of image information a plurality of subject images that are formed respectively by the plurality of imaging optical lenses;
wherein the apparatus further comprises a mechanism of rotating the plurality of imaging optical lenses and the plurality of imaging regions relative to each other in the plane perpendicular to the optical axes of the plurality of imaging optical lenses, and
when viewed along a direction parallel with the optical axes, at least one straight line connecting corresponding points in at least one pair of the subject images that are formed by at least one pair of the imaging optical lenses is inclined with respect to a direction in which the pixels are arranged.

2. The compound-eye imaging apparatus according to claim 1, satisfying $$\{(2n-1)\times p/2\}-p/4 < d\times\sin\theta < \{(2n-1)\times p/2\}+p/4$$

wherein when viewed along the direction parallel with the optical axes, θ indicates an angle that a straight line connecting the respective optical axes of at least one pair of the imaging optical lenses forms with the direction in which the pixels are arranged, d indicates a distance between the optical axes of the one pair of the imaging optical lenses, p indicates an arrangement pitch of the pixels along a direction perpendicular to the direction in which the pixels are arranged, and n is a positive integer.

3. The compound-eye imaging apparatus according to claim 1, wherein a filter transmitting light at a predetermined wavelength is provided on each optical path of the plurality of imaging optical lenses.

4. The compound-eye imaging apparatus according to claim 1, wherein the plurality of imaging optical lenses is an integrally-formed lens array.

5. The compound-eye imaging apparatus according to claim 1, further comprising a mechanism of adjusting a distance between the plurality of imaging optical lenses and the plurality of imaging regions.

6. The compound-eye imaging apparatus according to claim 2, wherein the number of the imaging optical lenses is at least three,
when viewed along the direction parallel with the optical axes, a first straight line and a second straight line respectively connecting the optical axes of two pairs of the imaging optical lenses form substantially a right angle, and $$\{(2n-1)\times p1/2\}-p1/4 < d1\times\sin\theta1 < \{(2n-1)\times p1/2\}+p1/4 \text{ and}$$

$$\{(2m-1)\times p2/2\}-p2/4 < d2\times\sin\theta2 < \{(2m-1)\times p2/2\}+p2/4$$

are satisfied, wherein when viewed along the direction parallel with the optical axes, θ1 indicates an angle that the first straight line forms with a first arrangement direction of the pixels, θ2 indicates an angle that the second straight line forms with a second arrangement direction of the pixels, d1 indicates a distance between the optical axes of a pair of the imaging optical lenses arranged along the first straight line, d2 indicates a distance between the optical axes of a pair of the imaging optical lenses arranged along the second straight line, p1 indicates an arrangement pitch of the pixels along a direction perpendicular to the first arrangement direction, p2 indicates an arrangement pitch of the pixels along a direction perpendicular to the second arrangement direction, and m and n indicate positive integers.

7. The compound-eye imaging apparatus according to claim 6, wherein the distance d1 between the optical axes and the distance d2 between the optical axes are different.

8. The compound-eye imaging apparatus according to claim 6, wherein the arrangement pitch p1 and the arrangement pitch p2 are different.

9. The compound-eye imaging apparatus according to claim 6, wherein the number of the imaging optical lenses is four and the number of the imaging regions is four,
when viewed along the direction parallel with the optical axes, optical axes of the four imaging optical lenses are arranged at vertices of a substantial rectangle, and
a filter transmitting light in a blue wavelength range is provided on an optical path of light entering one of the four imaging regions, a filter transmitting light in a red wavelength range is provided on an optical path of light entering one of the remaining three imaging regions, and a filter transmitting light in a green wavelength range is provided on an optical path of light entering the remaining two imaging regions.

10. The compound-eye imaging apparatus according to claim 9, wherein the four imaging regions are formed on a common single imaging device, and the substantial rectangle and a shape of an effective pixel region of the imaging device are substantially similar.

11. The compound-eye imaging apparatus according to claim 2, wherein the positive integer n satisfies $$n<A\min/(4\times f)$$

wherein Amin indicates a distance to the nearest subject whose image is to be captured, and f indicates an imaging distance of the imaging optical lenses.

12. The compound-eye imaging apparatus according to claim 6, wherein the positive integers m and n satisfy $$n<A\min/(4\times f)$$

$$m<A\min/(4\times f)$$

wherein Amin indicates a distance to the nearest subject whose image is to be captured, and f indicates an imaging distance of the imaging optical lenses.

13. A compound-eye imaging apparatus comprising:
a plurality of imaging optical lenses arranged in substantially the same plane; and
a plurality of imaging regions, each of which comprises a large number of pixels that are arranged in a plane perpendicular to respective optical axes of the plurality of imaging optical lenses, for converting into a plurality of pieces of image information a plurality of subject images that are formed respectively by the plurality of imaging optical lenses;
wherein the number of the imaging optical lenses is at least three,
when viewed along a direction parallel with the optical axes, a first straight line and a second straight line respectively connecting the optical axes of two pairs of the imaging optical lenses form substantially a right angle,
when viewed along the direction parallel with the optical axes, the first straight line and the second straight line intersect at the optical axis, $$\{(2n-1)\times p1/2\}-p1/4-d1\times\sin\theta 1<\{(2n-1)\times p1/2\}+p1/4$$
and $$\{(2m-1)\times p2/2\}-p2/4<d2\times\sin\theta 2<\{(2m-1)\times p2/2\}+p2/4$$

are satisfied, wherein when viewed along the direction parallel with the optical axes, θ1 indicates an angle that the first straight line forms with a first arrangement direction of the pixels, θ2 indicates an angle that the second straight line forms with a second arrangement direction of the pixels, d1 indicates a distance between the optical axes of a pair of the imaging optical lenses arranged along the first straight line, d2 indicates a distance between the optical axes of a pair of the imaging optical lenses arranged along the second straight line, p1 indicates an arrangement pitch of the pixels along a direction perpendicular to the first arrangement direction, p2 indicates an arrangement pitch of the pixels along a direction perpendicular to the second arrangement direction, and m and n indicate positive integers, and
the positive integers m and n satisfy $$n<A\min/(4\times f)$$

$$m<A\min/(4\times f)$$

wherein Amin indicates a distance to the nearest subject whose image is to be captured, and f indicates an imaging distance of the imaging optical lenses.

14. A method of manufacturing a compound-eye imaging apparatus, the apparatus comprising:
a plurality of imaging optical lenses arranged in substantially the same plane; and
a plurality of imaging regions, each of which comprises a large number of pixels that are arranged in a plane perpendicular to respective optical axes of the plurality of imaging optical lenses, for converting into a plurality of pieces of image information a plurality of subject images that are formed respectively by the plurality of imaging optical lenses,
the method comprising a step of rotation for adjustment in which the plurality of imaging optical lenses and the plurality of imaging regions are rotated relative to each other in the plane perpendicular to the optical axes of the plurality of imaging optical lenses so that, when viewed along a direction parallel with the optical axes, at least one straight line connecting corresponding points in at least one pair of the subject images that are formed by at least one pair of the imaging optical lenses is inclined with respect to a direction in which the pixels are arranged.

15. The method according to claim 14,
wherein the step of rotation for adjustment is a step in which adjustment is made so as to satisfy $$\{(2n-1)\times p/2\}-p/4<d\times\sin\theta<\{(2n-1)\times p/2\}+p/4$$

wherein, when viewed along the direction parallel with the optical axes, θ indicates an angle that a straight line connecting the respective optical axes of at least one pair of the imaging optical lenses forms with the direction in which the pixels are arranged, d indicates a distance between the optical axes of the one pair of the imaging optical lenses, p indicates an arrangement pitch of the pixels along a direction perpendicular to the direction in which the pixels are arranged, and n is a positive integer.

16. The method according to claim 15,
wherein the positive integer n satisfies $$n<A\min/(4\times f)$$

wherein Amin indicates a distance to the nearest subject whose image is to be captured, and f indicates an imaging distance of the imaging optical lenses.

* * * * *